United States Patent [19]

Hosoi

[11] Patent Number: 4,789,872
[45] Date of Patent: Dec. 6, 1988

[54] MULTI-COLOR ENERGY TRANSFER IMAGE RECORDING SYSTEM

[75] Inventor: Masatoshi Hosoi, Okazaki, Japan

[73] Assignee: Ricoh Company, Ltd., Tokyo, Japan

[21] Appl. No.: 51,716

[22] Filed: May 20, 1987

[30] Foreign Application Priority Data

May 22, 1986 [JP] Japan .................. 61-116229

[51] Int. Cl.$^4$ ............................ G01D 15/10
[52] U.S. Cl. .................. 346/76 PH; 400/120
[58] Field of Search .......... 346/76 PH, 76 R; 219/216 PH; 400/120 PH; 358/296, 298, 75; 364/518, 519

[56] References Cited

U.S. PATENT DOCUMENTS 4,672,393 6/1987 Uchikata et al. ............. 346/76 PH

Primary Examiner—E. A. Goldberg
Assistant Examiner—Huan Tran
Attorney, Agent, or Firm—Oblon, Fisher, Spivak, McClelland & Maier

[57] ABSTRACT

An image recording apparatus which applies energy of distributed level to record, on a pixel by pixel basis, image fragments whose density or saturation (tone) corresponds to the necessary energy levels. Image fragments corresponding to an amount of heat of a comparatively high level are contained, on a pixel basis, in image fragments corresponding to an amount of heat of a comparatively low level, whereby record data of the image fragments corresponding to the amount of heat of the comparatively low level are provided. When image fragments corresponding to any of the levels are to be recorded, an amount of heat corresponding to a difference between that particular level and the lowest level is generated.

4 Claims, 31 Drawing Sheets

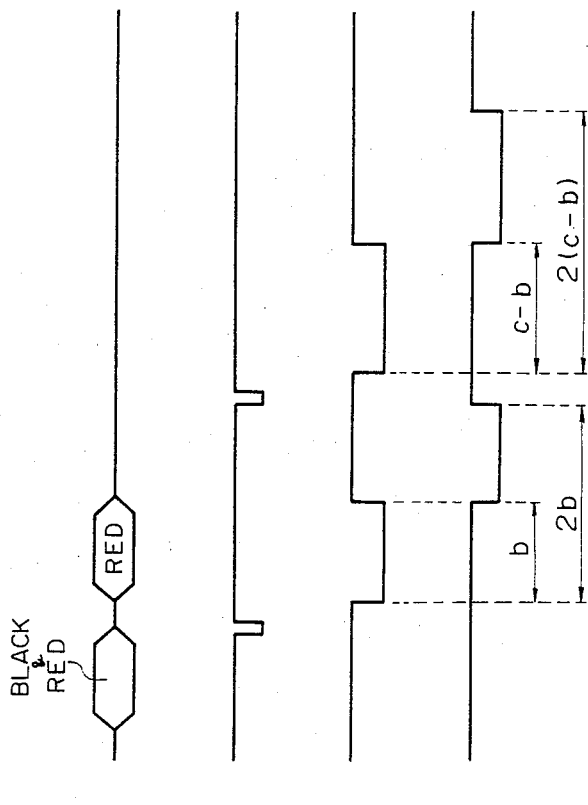

Fig. 10A
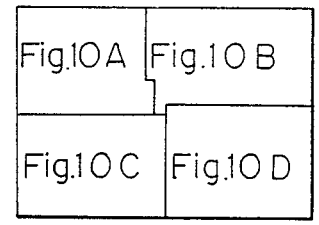
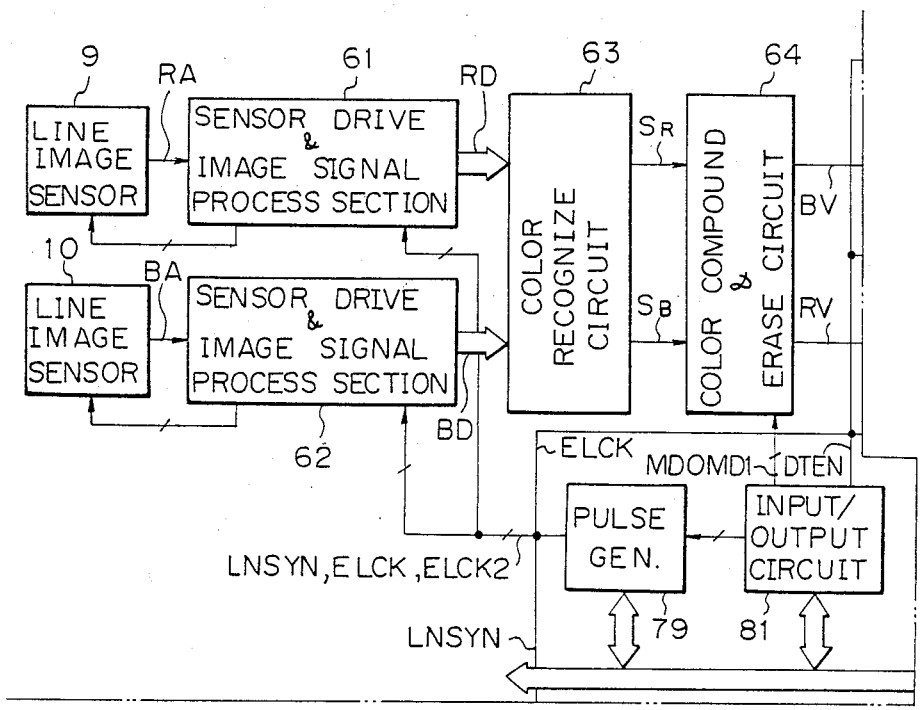

Fig.20A  EP
Fig.20B  LNSYN
Fig.20C  OUTPUT OF 173
Fig.20D  LT1
Fig.20E  OUTPUT OF 175
Fig.20F  STB1~4(1)
Fig.20G  STB5~8(1)
Fig.20H  CK1
Fig.20I  DT1

MULTI-COLOR ENERGY TRANSFER IMAGE RECORDING SYSTEM

BACKGROUND OF THE INVENTION

The present invention relates to an apparatus for, by application of energy of distributed levels, recording an image having density or saturation (tone) each corresponding to a respective one of the energy levels, on a pixel basis.

Today, a multi-color heat-sensitive recording apparatus is available which records images in a plurality of colors by use of a multi-color heat-sensitive recording paper, which is provided with a laminate of a plurality of coloring layers thereon. For example, when a multi-color heat-sensitive recording apparatus capable of recording images in red as well as in black and white is applied to a plotter of a facsimile terminal, a document which is partly underlined or otherwise marked in red for emphasis or which includes characters written in red for the same purpose may be sent to a remote terminal to enhance effective image data transmission. Another possible application of the above described type of recording apparatus is to a graphic input terminal, or so-called electronic blackboard, which should allow one to record and output minutes and others as effectively as possible.

A recording paper for use with such a black, white and red type heat-sensitive recording apparatus includes a paper base, and three different layers which are sequentially laminated on the paper base, i.e., a red coloring layer which colors in red, a black erasing layer which erases black, a black coloring layer which colors in black, and a protective layer. When a heating resistor having a contact surface which is dimensioned to define a single pixel is brought into contact with the protective layer and, then, heated, the three consecutive layers are selectively effected depending upon the amount of heat applied to the laminate. Specifically, when a sufficient amount of heat is applied to the protective layer and black coloring layer, the black coloring layer colors over its limited area which corresponds to the pixel so as to record a black pixel; when a greater amount of heat is applied, the black erasing layer is effected to erase the black pixel; and when a still greater amount of heat is applied, the red coloring layer colors to record a red pixel. It is to be noted that the amount of heat (energy) required for a red pixel to be formed is multiple times, e.g., about three times greater than that required for a black pixel to be formed.

A multi-color heat-sensitive recording apparatus of the kind using a heat-sensitive paper as stated above is only illustrative, and other various kinds of such recording apparatuses are known in the imaging art, e.g., a one in which the area of a pixel is dependent upon the energy level.

In the above described kind of recording apparatus, a record head is implemented with a thermal head having a predetermined number of heating elements, or heating resistors, which are arranged in an array and each has a size corresponding to that of a pixel. The heating elements are driven on the basis of one line of image while, at the same time, the heat-sensitive recording paper is moved relative to and perpendicular to the array of heating elements, whereby an image is recorded in the heat-sensitive paper. Assuming that the recording density available with the recording apparatus is eight dots per millimeter and the recording width is 216 millimeters, which is the width of an A4 format, the thermal head needs to be furnished with 1728 heating resistors in total. Usually, the thermal head is produced as a single device in which the wirings to the individual heating resistors are implemented by a printing process.

In case that the thermal head with the above configuration is used and driven at a time, a power source having a substantial capacity is needed to drive, at maximum, the 1728 heating resistors simultaneously. For this reason and, because it is impracticable to supply such a large current at a given time due to the inherent construction of the thermal head, it is the usual practice to divide the thermal head into a plurality of blocks and sequentially supply current to the discrete blocks. This arrangement cuts down the required capacity of a power source as well as the current which should be supplied at a time.

Usually, the service life of a thermal head is exponentially reduced as the amount of heat generated by heating resistors elements per unit time and the duration of continuous drive, i.e., the pulse width of a strobe signal are increased. Hence, should the thermal head be driven continuously over the period of time assigned to a red image and which is three times longer than the period of time assigned to black and white images, it would become unoperable soon. For this reason, it is impossible for the thermal head to be driven directly over such a long continuous period of time. In the light of this, it has been customary to record a red image by repetitively tracing the same line for a duration which would ensure a certain life of the thermal head each time and, thereby, applying a required amount of heat.

In the above situation, a prior art multi-color heat-sensitive recording apparatus consumes a considerable period of time to record a red image and, therefore, cannot be readily put to practical use.

SUMMARY OF THE INVENTION

It is therefore an object of the present invention to provide an image recording apparatus which eliminates the drawbacks particular to a prior art apparatus as discussed above and is capable of recording within a short period of time an image which is made up of pixels of multiple levels.

It is another object of the present invention to provide a generally improved image recording apparatus.

An apparatus for recording an image in a recording medium by inputting a plurality of kinds of record data, which constitute a same image, and applying to a record head on a pixel basis amounts of heat of distributed levels which correspond to the individual record data of the present invention comprises record data combining means for combining the plurality of kinds of record data to produce a plurality of composite record data in which image fragments corresponding the amount of heat of a high level are contained in image fragments corresponding to the amount of heat of a low level which is lower than the high level, and energy applying means for, when the plurality of composite record data are to be recorded, applying to the record head an amount of heat of a level corresponding to a difference between an amount of heat corresponding to, among the record data included in the respective composite record data, particular record data which is to be recorded by an amount of heat of the lowest level and an amount of heat necessary for record data which is included in the composite record data other than that record data to be recorded by the lowest level and is to be recorded by an amount of heat which is one step lower in level than that record data.

The above and other objects, features and advantages of the present invention will become more apparent from the following detailed description taken with the accompanying drawings.

BRIEF DESCRIPTION OF THE DRAWINGS

FIGS. 6A to 6D are wave-form diagrams representative of an exemplary sequence of drive of a multi-color heat-sensitive recording apparatus which is implemented with the principle of the present inention;

DESCRIPTION OF THE PREFERRED EMBODIMENT

Figure 1:
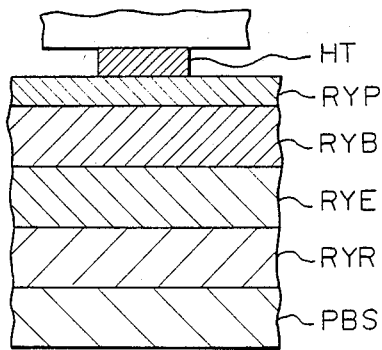
FIG. 1 is a schematic view showing the principle of operation of a multi-color heat-sensitive recording apparatus which uses a multi-color heat-sensitive recording paper.

Referring to FIG. 1 of the drawings, a multi-color heat-sensitive recording paper for recording images in black, white and red is shown. As previously stated, the recording paper includes a paper base PBS, and three different layers which are sequentially laminated on the paper base PBS, i.e., a red coloring layer RYR which colors in red, a black erasing layer RYE which erases black, a black coloring layer RYB which colors in black, and a protective layer RYP. When a heating resistor HT having a contact surface which is dimensioned to define a single pixel is brought into contact with the protective RYP layer and, heated, the three consecutive layers RYR, RYE and RYB are selectively effected depending upon the amount of heat applied to the laminate. Specifically, when a sufficient amount of heat is applied to the protective layer RYP and black coloring layer RYB, the black coloring layer RYB colors over its limited area which corresponds to the pixel so as to record a black pixel; when a greater amount of heat is applied, the black erasing layer RYE is effected to erase the black pixel; and when a still greater amount of heat is applied, the red coloring layer RYR colors to record a red pixel.

In an image recording apparatus of the type recording image segments of different colors or density on a pixel basis by use of such a recording paper, use is made of a thermal head having a predetermined number of heating resistors HT which are arranged in an array, each resistor HT corresponding in dimension to a pixel. As stated earlier, assuming that the recording density of the recording apparatus is eight dots per millimeter and the recording width is 216 millimeters, the thermal head has to be furnished with 1728 heating resistors HT in total. As also mentioned earlier, such a thermal head is divided into a plurality of blocks and sequentially powered block by block to reduce the required capacity of a power source. This customary implementation will be described in more detail with reference to the drawings.

Figure 2:
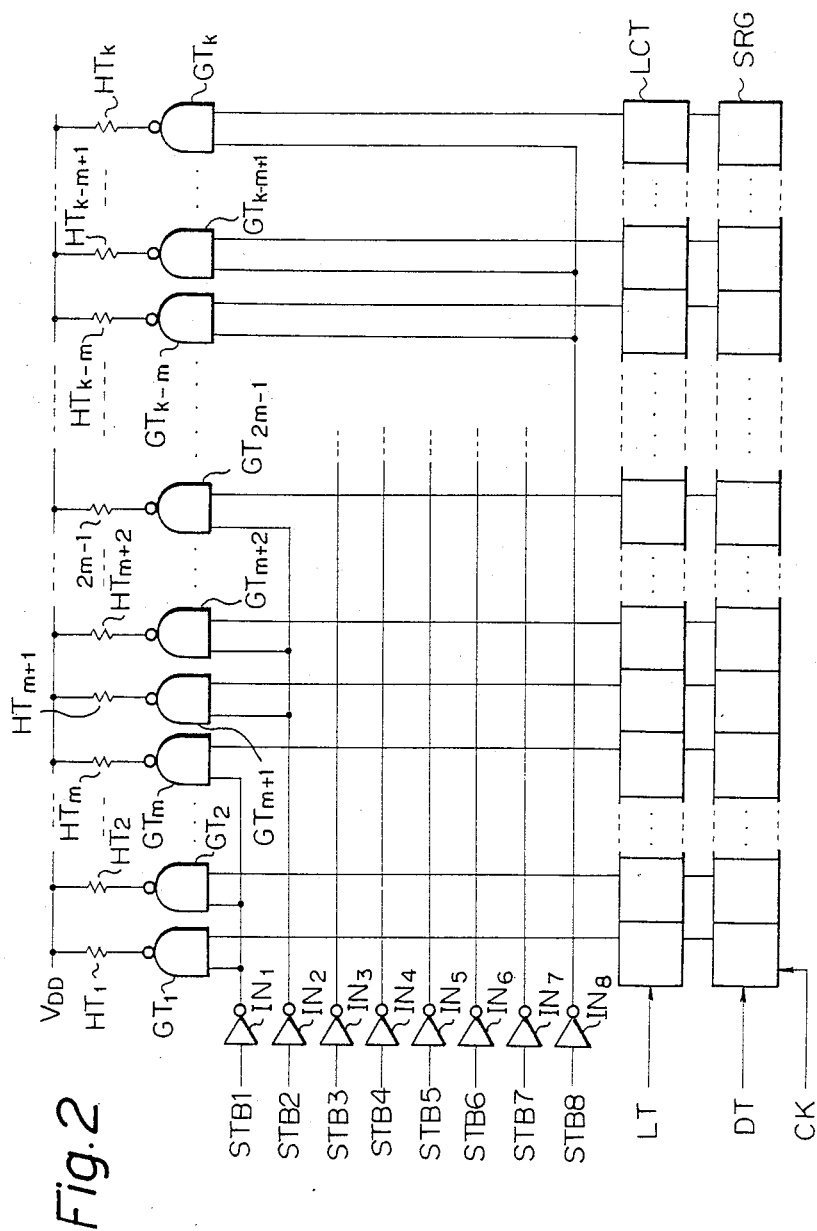
FIG. 2 is a circuit diagram showing an example of thermal heads.
Figure 3:
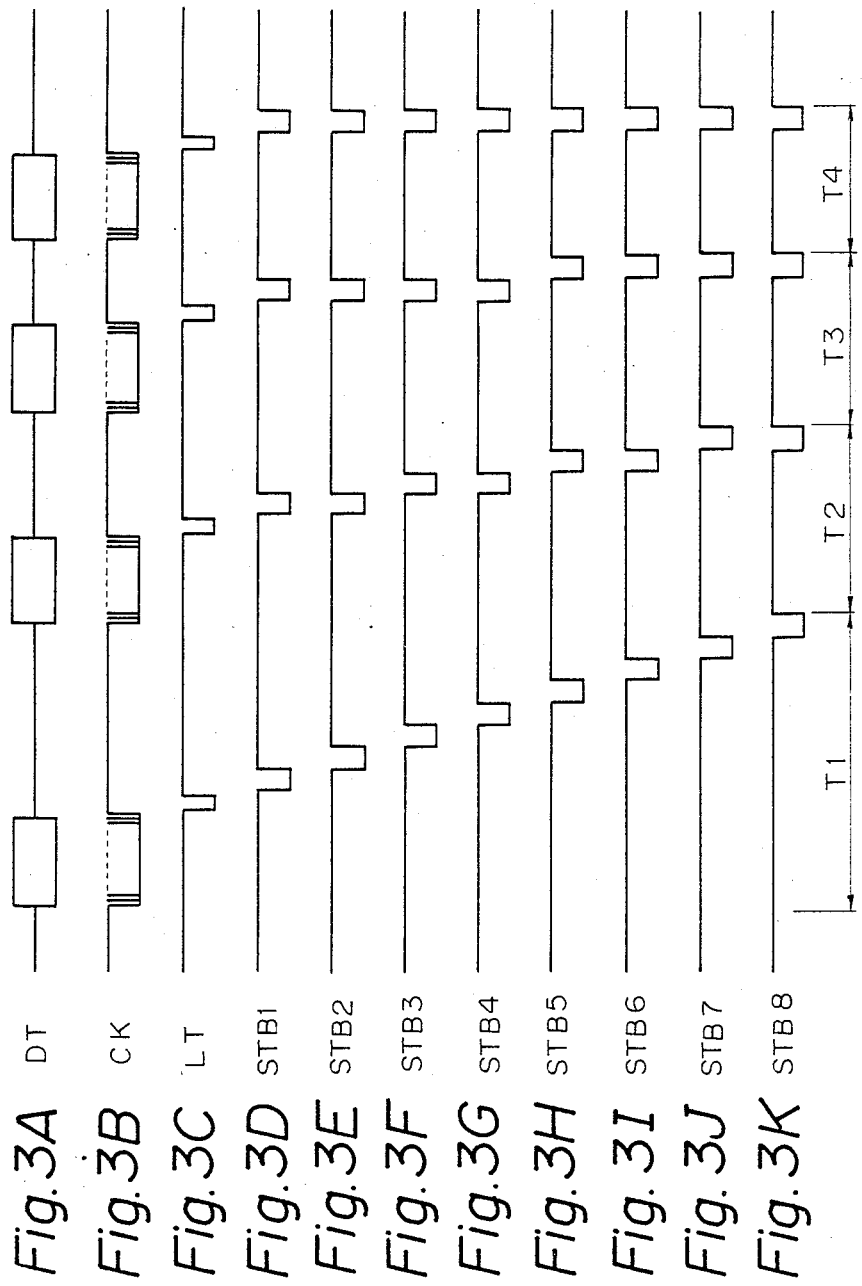
FIGS. 3A to 3K are wave-form diagrams representative of the operation of the thermal head.
Figure 4:
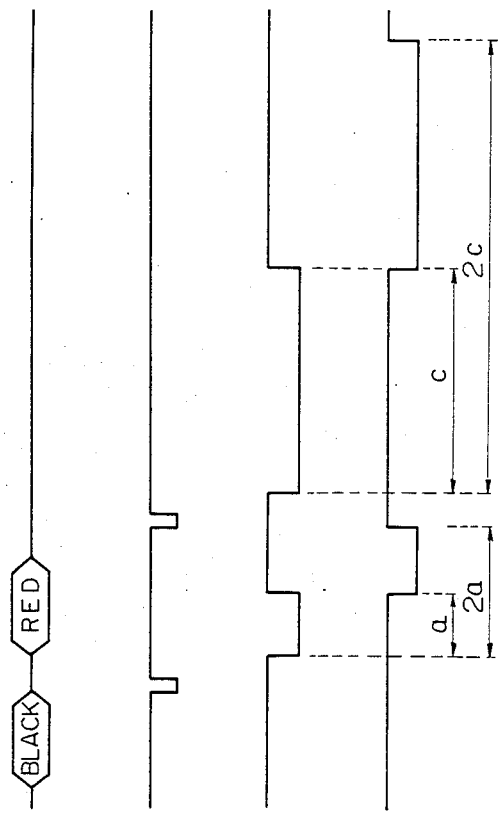
FIGS. 4A to 4D are wave-form diagrams demonstrating an exemplary manner of drive of a prior art apparatus.

FIG. 2 shows an exemplary arrangement in which a thermal head is divided into eight discrete blocks so as to record an image block by block. As shown, the thermal head is provided with a shift register SRG for accommodating one line of record data DT, and a latch circuit LCT for storing one line of record data DT. Such a thermal head is capable of receiving one line of record data DT while printing out the previous one line of data and, therefore, capable of printing out data at a high speed. A clock signal CK is adapted to input data DT to the shift register SRG. The output of each bit of the latch circuit LCT is coupled to one input terminal of a respective one of k gates $GT_1$ to $GT_k$, which respectively are adapted to drive k heating resistors $HT_1$ to $HT_k$. Strobe signals $STB_1$ to $STB_8$ are applied to the other input terminal of each m (=k/8) gates $GT_1$ to $GT_k$ via inverters $IN_1$ to $IN_8$. Asuming a recording width of A4 size and recording density of eight dots per millimeter as previously stated, k is 1728 and m, 216. In this construction, while any of the strobe signals $STB_1$ to $STB_8$ is (logical) low level, those heating resistors $HT_1$ to $HT_k$ associated with that strobe signal and corresponding to those bits wherein the content of record data DT is (logical) ONE are energized to print out an image fragments.

The sequence of application of the strobe signals STB$_1$ to STB$_8$ is determined by the number of blocks of the thermal head, an example being shown in FIGS. 3A to 3K. In the figures, T$_1$ is representative of a period of time necessary for one line of data to be printed out when the thermal head is divided into eight, T$_2$ a period of time necessary for the same to be printed out when the head is divided into four, T$_3$ a period of time necessary for the same to be printed out when the head is divided into two, and T$_4$ a period of time necessary for the same to be printed out simultaneously. Needless to mention, the smaller the number of divisions, the shorter the period of time required becomes. For this reason, when it is desired to increase the recording speed as far as possible, the thermal head is divided into two.

The amount of heat J generated by a heating resistor is expressed as:

$$J = P \cdot t \qquad (1)$$

where P is the amount of heat generated by a heating resistor per unit time, and t is the period of time during which the heating resistor is driven, i.e., the pulse width of a strobe signal.

As previously stated, when a black image and a red image are to be recorded in a recording paper of the kind described, the amount of heat necessary to record a red image is substantially three times greater than that necessary to record a black image. It will therefore be seen from the Eq. (1) that in the case of black, white and red image recording all that is required is making the width of the strobe signal substantially three times greater for a red (red/non-red) image than for a black (black and white) image, as shown in FIGS. 4A to 4D. It should be born in mind that a width c of the strobe signal adapted to record a red/non-red image corresponds to a minimum necessary amount of heat for causing the recording paper to color in red, and a width a adapted to record a black and white image corresponds to a minimum necessary amount of heat for causing it to color in black (see FIG. 5).

Meanwhile, the life N of a thermal head is expressed as:

$$N = A \cdot P^{-i} \cdot t^{-j} \cdot T^{-k} \qquad \text{Eq. (2)}$$

where A is a coefficient, T is the repetition frequency of the strobe signal, i is 25 to 20, j is 18 to 12, and k is 6 to 2. These various constants depend upon the type of a thermal head and other factors.

Such implies that the life of a thermal head decreases exponentially with the increase in the amount of heat generated by a heating resistor HT per unit time as well as the duration of continuous drive, i.e., the pulse width of the strobe signal. Hence, when the thermal head is driven to print out a red image over a duration which is substantially three times longer than the duration of drive necessary to print out a black-white image, the life of the thermal head will expire soon, as stated earlier. A prior art apparatus which overcomes the above problem by repetitively heating the same line for a certain short duration each time, brings about another problem of considerably longer recording time.

Before entering into a detailed description of a preferred embodiment of the present invention, the principle underlying the present invention will be explained with reference to FIGS. 5 and 6A to 6D.

Figure 5:
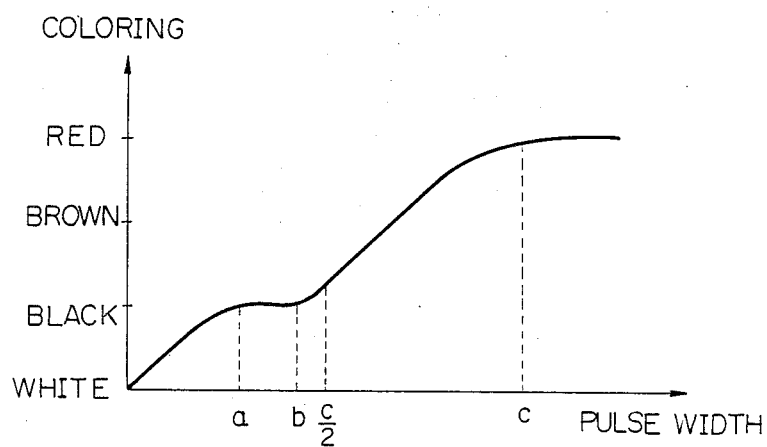
FIG. 5 is a graph useful for explaining the principle of the present invention.

When it is desired to record image fragments in white, black and red in a recording paper of the kind described, the pulse width of a strobe signal to be applied to a thermal head for recording an image and the coloring of the recording paper are related as shown in FIG. 5. As shown, the recording paper colors in black while the pulse width lies in the range of a to b, and in red as the pulse width increases beyond c. It is to be noted that in the pulse width range of b to c the red coloring layer of the recording paper is not effected to such a degree that it is recognizable to be red and, instead, the intermediate color between black and red, i.e., brown is developed.

The thermal conductivity of a multi-color heat-sensitive recording paper is not so great, and the interval between recording of a black pixel and that of a red pixel is very short. Hence, during the interval after the recording of a black pixel and before that of a red pixel, that portion of the paper corresponding to a particular pixel which was heated for recording the black image holds substantially the whole amount of heat used to record the black pixel. Further, because the coloring process occurring in the recording paper is derived from chemical reactions of the different layers, it is needless for an amount of heat once supplied to be supplied again. Specifically, when the amount of heat needed for red to develop is additionally applied to a portion of the recording paper which has been colored black, that portion will turn itself into a red area.

Based on the above, it was found that when OR data of black and red image fragments and red image fragment data are sequentially recorded in this order on a line-by-line basis, not only black, white and red image fragments can be recording but also the pulse width of the strobe signal applied for the second time to record red fragments can be reduced. Specifically, assuming that the pulse width for recording the OR data of black and red fragments is a, the pulse width of the strobe signal applied for the second time to record red fragment data is produced as (c−a). This means a considerable decrease in the required pulse width, compared to a case wherein red image data are recorded independently of black image data. In addition, such allows a thermal head to attain a substantial life even if current is applied thereto at a time. Consequently, the period of time necessary for an image to be recorded in black, white and red is remarkably shortened to realize a practical multi-color heat-sensitive recording apparatus.

As represented by the Eq. (2), the life of a thermal head decreases exponentially with the increase in the pulse width of a strobe signal. This suggests that when a red image fragment is to be record by the above-described method, applying the pulse width c/2 of the strobe signal (FIG. 5) to both of the recording of OR data of black and red image fragments and the subsequent recording of image fragment data renders the service life of a thermal head longest. However, the pulse width c/2 is undesirable because it is greater than the pulse width b, which is the upper limit for black to develop, and would cause black image fragments to turn into brown. Thus, if the pulse width b is used for the strobe signal adapted to record OR data of black the red fragments and the pulse width (c−b) for the strobe signal adapted to record red fragment data only, the black fragments can be recorded adequately and, yet, a thermal head achieves the longest service life.

FIGS. 6A to 6D show a recording sequence which is effected in the above-stated conditions and with a thermal head divided into two. The recording sequence of the figures are implemented with the thermal head of FIG. 2.

As stated above, image fragments corresponding to the amount of heat of comparatively low level and those corresponding to the amount of heat of comparatively high level are recorded sequentially. The image fragments corresponding to the amount of heat of higher level are contained in the image fragments corresponding to the amount of heat of lower level on a pixel basis, thereby forming record data of record data of the image fragments corresponding to the amount of heat of lower level. When the image fragments corresponding to the amount of heat of higher level, an amount of heat whose level corresponds to the shortage is applied. With such a principle, the present invention remarkably increases the recording speed of an image recording apparatus which is adapted to record an image having pixels of multiple levels.

It should be born in mind that the present invention is similarly applicable to a an image recording apparatus of any type other than the above-described one which records image fragments in a plurality of colors by use of a multi-color heat-sensitive recording paper. For example, the present invention may be applied to a thermal transfer type recording apparatus in which amounts of heat of different levels are applied to record dots each having a size, relative to the area of a pixel having a predetermined size, (or pixel size) which corresponds to a respective one of the levels. Further, the present invention is applicable even to a recording apparatus which uses energy other than thermal energy.

Referring to FIGS. 7A to 7E, a graphic input terminal, or so-called electronic blackboard, to which the present invention is applied and which has a black, white and red image recording and outputting capability is shown. As shown, the graphic input terminal includes a sheet 1 for writing alphanumeric characters, figures and any other desired information. At its both ends, the sheet 1 is wound around paper tubes 2 and 3 which are received in a body of the graphic input terminal, while being held in contact with a front board 4 to provide a flat recording surface. An image written on the sheet 1 is illuminated by fluorescent lamp 5 inside of the terminal body, and a reflection from the sheet 1 is focused onto line image sensors 9 and 10 via a mirror 6 and lenses 7 and 8. The terminal body is supported by legs 11 and 12 at its both sides. An operating and display section 13 is provided on the recording surface surface side and adjacent to one of the both ends of the terminal body, for operating the terminal. A printer 14 for printing out information which is written on the sheet 1 is mounted on the back of the terminal body, a paper printed with information by the printer 14 being fed to a tray 15.

A red filter 16 transparent for a red image component and a cyan filter 17 transparent for a cyan image component, which is complementary to red, are positioned immediately before the lenses 7 and 8, respectively. In this construction, a red image component is incident to the line image sensor 9, and a cyan image component to the line image sensor 10. Consequently, the line image sensor 9 produces an image signal representative of the red image component, and the line image sensor 10 an image signal representative of the cyan image component. The outputs of the line image sensors 9 and 10 are processed with respect to the same address in the main scanning direction, which will be described later, thereby identifying white, black and red image fragments. Naturally, the position of the reading width, the position of an optical system for equalizing the magnification (reduction ratio) of the lenses 7 and 8, the positions of the line image sensors 9 and 10, and others are so adjusted as to allow the line image sensors 9 and 10 to read the same image.

Figure 7A:
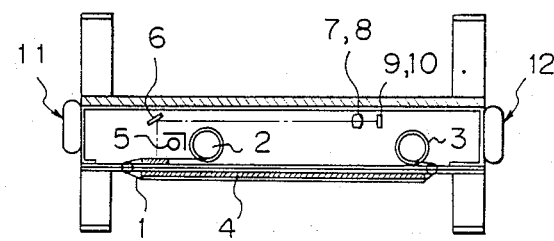
FIGS. 7A to 7E are schematic views showing a graphic input terminal, or electronic blackboard, to which the present invention is applied.
Figure 7B:
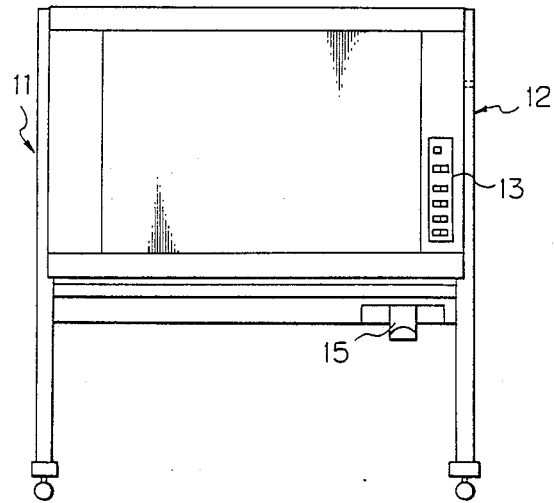
Figure 7C:
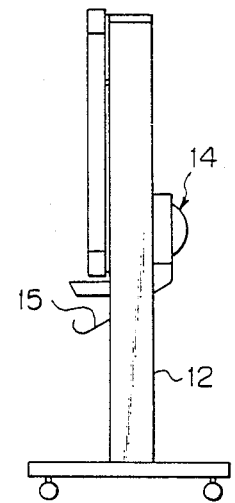
Figure 7D:
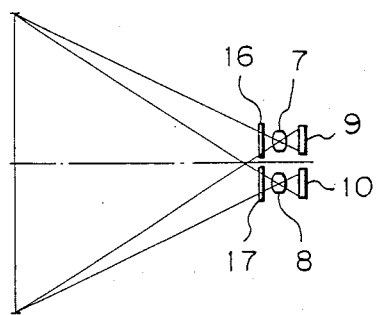
Figure 7E:
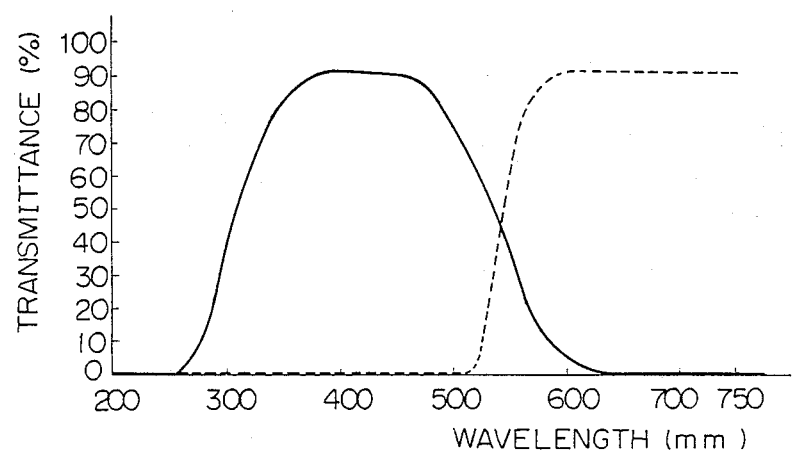
Figure 8A:
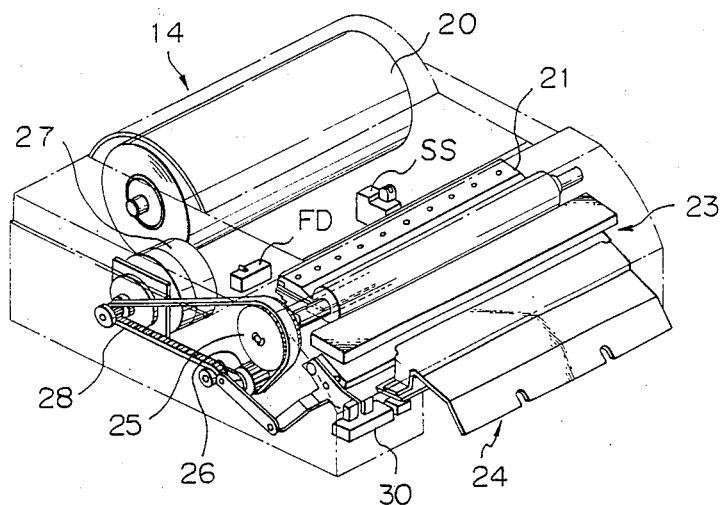
FIGS. 8A to 8D are schematic views showing an example of printers.
Figure 8B:
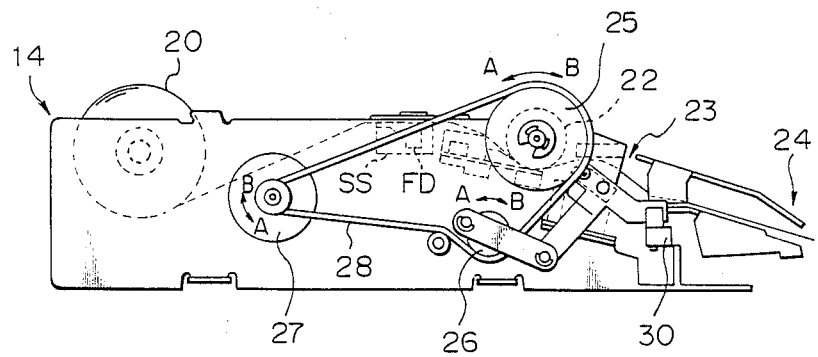
Figure 8C:
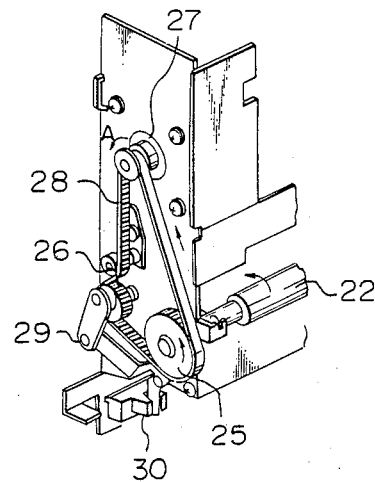
Figure 8D:
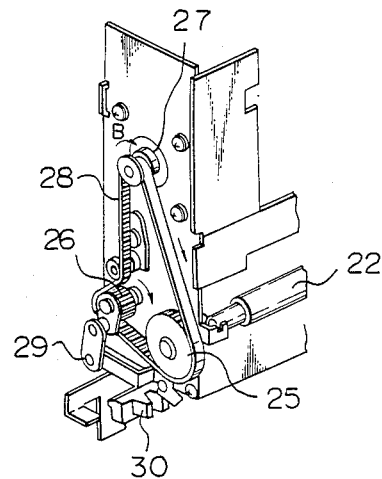

The spectral characteristics of the red filter 16 and cyan filter 17 are represented by, respectively, a dotted and a solid line in FIG. 7E by way of example. Although the red filter 16 and the cyan filter 17 are not completely complementary to each other, red can be identified by a method which will be described in detail later. Color components which lie in the frequency range where the characteristics of the filters 16 and 17 overlap, i.e., so-called drop-out colors cannot be read. Rules (vertical and horizontal) may be provided on the sheet 1 by using any of such drop-out colors so as to promote convenient use of the graphic input terminal. In this particular example, yellow and orange rules are provided on the sheet 1.

Referring to FIGS. 8A to 8D, an example of the printer 14 is shown. A multi-color heat-sensitive recording paper 20 in a form of a roll has the same laminate structure as that of FIG. 1 and is capable of recording black, white and red images. While the paper 20 which is inserted between a thermal head 21 and a platen roller 22 is fed at a predetermined rate by the platen roller 22, the thermal head 21 prints out an image in the paper 20. Upon completion of image recording, the paper 20 is cut by a cutter 23 with the cut length guided to the tray 15, not shown, by a guide 24. A shaft on which the platen roller 22 is mounted is connected to a pulley 25 through a one-way clutch which couples in the counterclockwise direction A and uncouples in the clockwise direction B. A timing belt 28 for transmitting power from a motor 27 is passed over the pulley 25 and a pulley 26 which serves to drive the cutter 23. A link 29 also adapted to drive the cutter 23 is connected to the pulley 26 through a one-way clutch which uncouples in the counterclockwise direction A and couples in the clockwise direction B. The link 29 turns on and off a photointerrupter 30 at one end thereof:

As the motor 27 is rotated in the counterclockwise direction A, the platen roller 22 is rotated to feed the recording paper 20. At this instant, the link 29 remains unmoved and, therefore, the photointerrupter 30 remains OFF (see FIG. 8C). When the motor 27 is rotated in the clockwise direction B, the platen roller 22 and, therefore, the recording paper 20 is stopped. On the other hand, the link 29 is moved to actuate the cutter 23 to thereby cut the recording paper 20. While the link 29 is moved to actuate the cutter 23, the photointerrupter 30 remains ON; as the pulley 26 completes one rotation to restore the link 29 to its original position, the photointerrupter 30 becomes OFF again (see FIG. 8D). In this manner, the photointerrupter 30 becomes ON as the motor 27 is rotated in the clockwise direction B, and it becomes OFF again as the cutter 23 fully cuts the recording paper 20. That is, whether or not the recording paper 20 has been fully cut can be decided by monitoring the output of the photointerrupter 30.

A sheet sensor SS is adapted to see if a sufficient amount of recording paper 20 is left. A feed switch FD is provided for manual feed of the recording paper 25 as would be required in the event of replacement of the roll.

Figure 9:
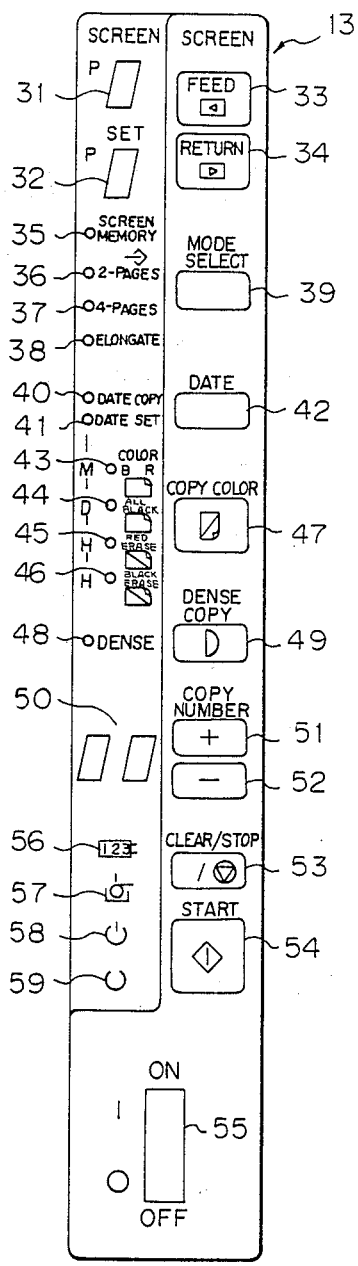
FIG. 9 is a plan view showing a specific construction of an operating and display section.

Referring to FIG. 9, a specific arrangement of the operating and display section 13 is shown. As shown, the operating and display section 13 includes a present screen display 31 adapted to display a screen number of the sheet 1 which is presently set on the display area of the graphic input terminal. A target screen display 32 functions to display a screen number which should be moved to the display area. The screen number appearing on this display 32 may be changed by manipulating a feed key 33 and a return key 34 which respectively are adapted to move the sheet 1 in the forward and reverse directions with respect to the screen number. In this particular embodiment, the number of screens which may be read is assumed to be four. Lamps 35, 36, 37 and 38 are adapted to show, respectively, a screen memory mode for recording an image stored a two-page mode for recording two pages or screens of images in one page by reduction, a four-page mode for recording four pages of images in one page by reduction, and a elongate mode for recording four pages of images continuously without reduction, the four different modes being free to choose by a mode select key 39. Specifically, every time the mode select key 39 is turned ON, the lamps 36 to 38 are caused to glow cyclically while, at the same time, a particular mode associated with the lamp glowing is set up. It is to be noted that in each of the two-page and four-page modes image reduction processing is performed while images are read and, in the elongate mode, the printer 14 records images while the images are read.

Further, a lamp 40 is adapted to show that a date copy mode for recording an image or images with a date added thereto is selected. A lamp 41 serves to indicate that a date set mode for setting a clock circuit which is built in the graphic input terminal is selected. A date key 42 may be manipulated to select either the date copy mode or the date set mode. Specifically, when the date key 42 is turned ON for more than a predetermined period of time, the date set mode is set up; when the ON state of the key 42 is stopped within the predetermined period of time, the date copy mode is selected by a toggle. Lamps 43, 44, 45 and 46 show, respectively, a black/red mode for recording black and red image fragments in their own colors, an all-black mode for recording all image fragments in black (i.e., even red ones in black), a red erase mode for recording an image while erasing red fragments of the image, and a black erase mode for recording an image while erasing black fragments of the image. A copy color key 47 is provided for selecting any of such four recording colors. Specifically, every time the copy color key 47 is turned on, the lamps 43 to 46 are caused to glow cyclically while, at the same time, a particular mode associated with the lamp glowing is set up. While the date set mode is selected, the lamps 43 to 46 are representative of the items to be corrected, i.e., "month", "day", "hour" and "minute", respectively. When none of the lamps 43 to 46 is turned on, the item to be corrected is "year". A lamp 48 glows to show that a mode for increasing the copy density is selected; this mode is selected by a toggle every time the key 46 is turned ON.

A display 50 is adapted to indicate the number of papers (multi-color heat-sensitive papers) to be produced. The content of the display 50 increases by one every time a plus key 51 is turned ON, and decreases by one every time a minus key 52 is turned ON. While the date set mode is selected, the display 50 serves to show the content (numeral) of an item to be corrected, the content being changeable by manipulating the keys 51 and 52. A clear/stop key 53 serves as a clear key for clearing data on the display 50 while the graphic input terminal is not operated, and as a stop key for stopping the operation of the terminal while the latter is operated. A start key 54 is provided for starting the operation of the terminal. A power switch 55 is adapted to turn ON and OFF a power source of the terminal. An error display 56 shows that a key counter is not set, and an error display 57 shows that the recording paper 20 has been used up. A state display 58 shows that the copying operation cannot be effected for one reason or another, and a state display 59 shows that the terminal is operable.

Figure 10B:
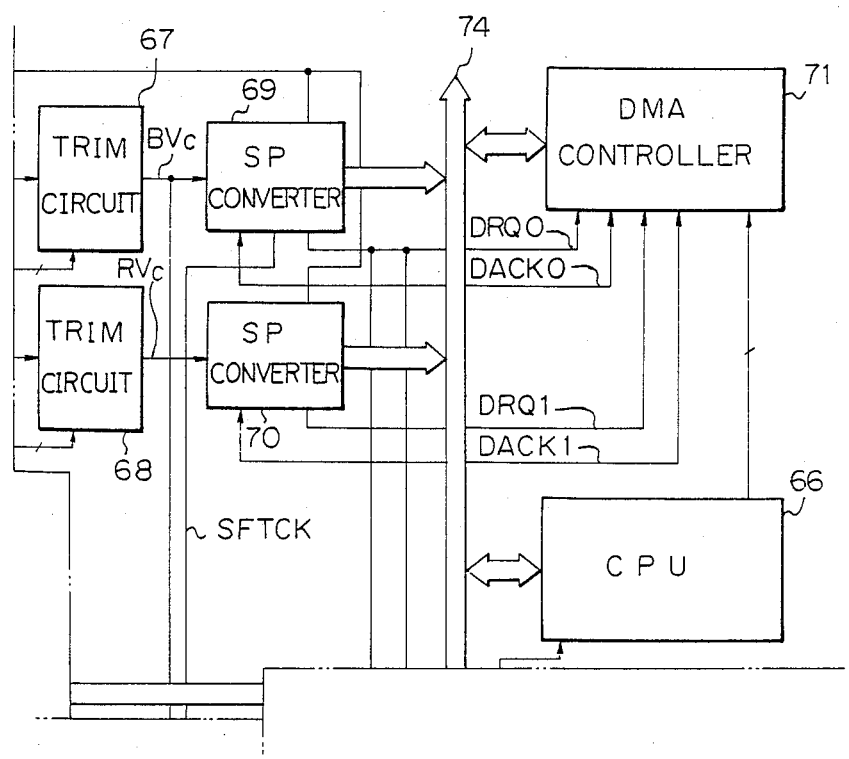
FIGS. 10A, B, C, D are block diagrams showing an exemplary control system.
Figure 10C:
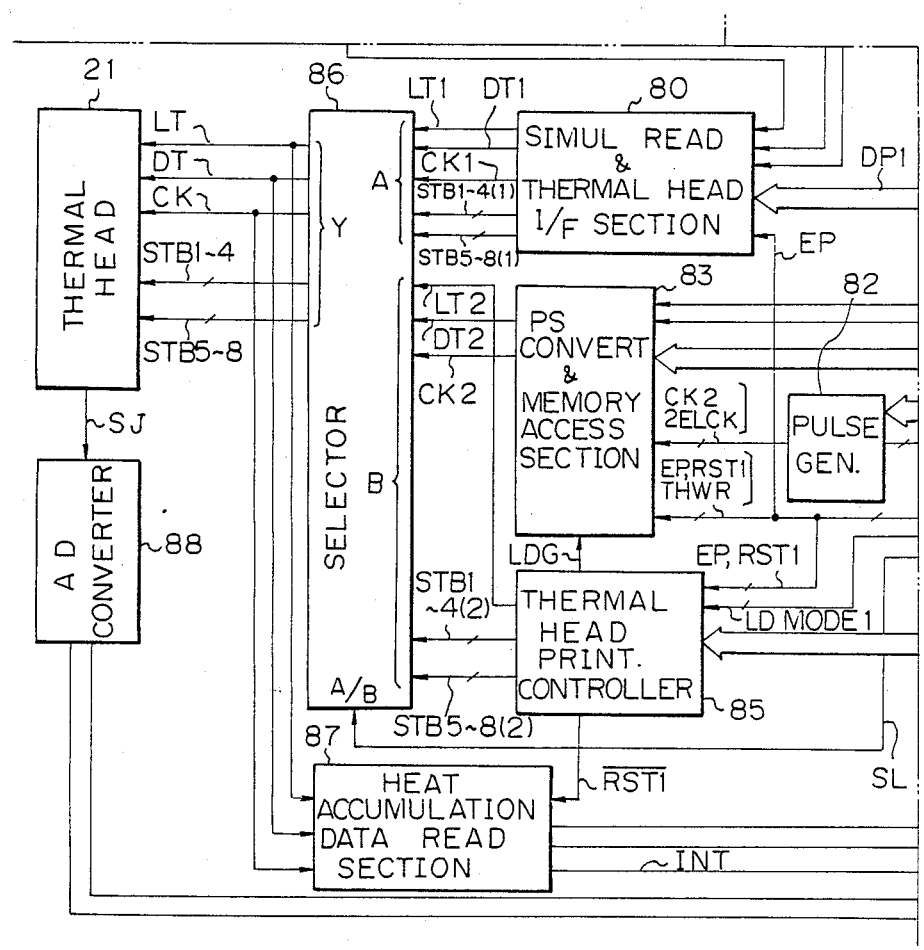
Figure 10:
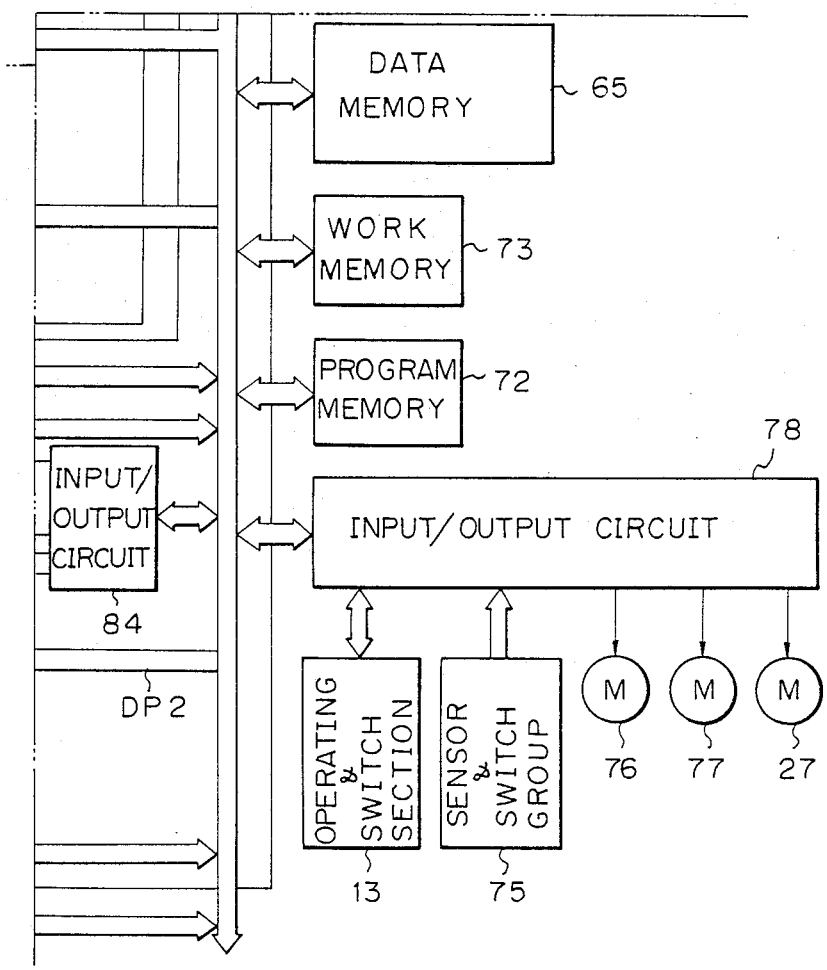

Referring to FIGS. 10A, B, C, D, a specific construction of a control system for controlling the graphic input terminal is shown. Sensor driving and image signal processing sections 61 and 62 function to drive the line image sensors 9 and 10, respectively. Another function assigned to the above sections 61 and 62 is receiving, respectively, an image signal RA representative of a red image component and outputted by the line image sensor 9 and an image signal BA representative of a cyan image component and outputted by the line image sensor 10, applying shading correction to the image signals RA and RB, converting the signals RA and RB to digital image signals RD and BD each having a predetermined number of bits, and delivering the digital signals RD and BD to a color recognizing circuit 63. The color recognizing circuit 63 calculates a sum of and a difference between the input digital image signals RD and BD with respect to each main scanning address. The circuit 63 determines the lightness of a pixel based on the sum and the saturation of the pixel based on the difference. Referencing the combination of lightness and saturation determined, the circuit 63 decides if the pixel is a black pixel, a white pixel or a red pixel. If the pixel is a black pixel, the circuit 63 makes a black signal SB and a red signal SR ONE and ZERO, respectively; in the case of a white pixel, it makes both the black and red signals SB and SR ZERO; in the case of a red pixel, it makes the black signal SB ZERO and the red signal SR ONE. Such black and red signals SB and SR are fed from the circuit 63 to a color compounding and erasing circuit 64.

The color compounding and erasing circuit 64 functions to form black record data BV and red record data RV for recording an image, based on a color mode selected, Specifically, when an image is to be recorded in black, white and red, OR data of black and white image fragments and red/non-red image fragments (i.e. black record data BV) are recorded first, and, then, the red/non-red image data (i.e. red record data RV), as previously stated. In conformity to this principle, the color compounding and erasing circuit 64 produces black record data BV and red record data RV on a pixel basis in response to the pixel-sequential black and red signals SB and SR which are outputted by the color recognizing circuit 63. The black and red record data BV and RV from the circuit 64 are applied to trimming, or edge erasing, circuits 67 and 68, respectively. The reason why the color compounding and erasing circuit 64 is provided immediately before a position where record data are to be written in a memory, which will be described, is as follows. Should the black and red record data BV and RV be produced relying on the logics of a microprocessor, which serves as a central processing unit (CPU) 66, with record data stored in a data memory 65, the processing would consume too much time to implement high-speed image recording.

The trimming circuits 67 and 68 are adapted to cross out image portions at both ends of the recording width by a predetermined number of pixels each, thereby converting those portions into white image portions. Such a function of the circuits 67 and 68 are desirable because a copy with margins provided along its edges is easier to see than a copy with an image recorded over its entire recording width, and because black lines and other unwanted image fragments are apt to appear in the end portions of the recording width. Black record data BVc and red record data RVc from the trimming circuits 67 and 68 are fed to serial-to-parallel (SP) converters 69 and 70, respectively. Each of the SP converters 69 and 70 is adapted to convert its associated record data BVc or RVc into a parallel signal having a predetermined number of bits (bit width of a data bus of a system bus which will be described) for storing the record data in the data memory 65. To execute the storage of the black and red record data BVc and RVc in the data memory 65 on a real-time basis, a direct memory access (DMA) controller 71 is used for the means for transferring the output data of the SP converters 69 and 70 to the data memory 65. That is, the data transfer is realized without the intermediary of the CPU 66.

The data memory 65 has a capacity sufficient to accommodate one page on screen of black and red record data BVc and RVc. It is to be noted that the black and red record data BVc and RVc are collectively stored in different areas of the data memory 65. The CPU 66 has a program memory 72 which is loaded with a control processing program, and a work memory 72 usable for a work area. A system bus 74 made up of a data bus, an address bus and a control bus provides interconnection between the CPU 66 and the other various sections. The control system further includes an input/output circuit 78 which intermediates the interchange of various kinds of data between the control system and the operating and display section 13, input of output data of various sensors and switches (sensor and switch group 75), and output of drive signals to sheet motors 76 and 77 adapted to move the sheet 1 in the forward and reverse directions, respectively, and to the motor 27 of the printer 14. The sensor and switch group 75 includes a sheet sensor responsive to the movement of the sheet 1, so that a screen number of the sheet 1 being used is identified by the CPU 66 by referencing the output of the sheet sensor.

A pulse generator 79 generates a line synchronizing signal LNSYN representative of the start of one line reading period, and clock signals ELCK and ELCK2 for setting up a pixel-by-pixel read timing from the line image sensors 9 and 10. The line synchronizing signal LNCYN is applied to the sensor driving and image signal processing sections 61 and 62 and a simultaneous reading and thermal head interface (I/F) section 80, which will be described layer. On the other hand, the clock signal ELCK is applied to the sensor driving and image signal processing sections 61 and 62, trimming circuits 67 and 68, and SP converters 69 and 70, while the clock signal ELCK2 is applied to the sensor driving and image signal processing sections 61 and 62. An input/output circuit 81 is adapted for the delivery of a control signal from the CPU 66 to the pulse generator 79 and for the generation of control signals output from the CPU 66, i.e., mode signals MD0 and MD1 for setting up a color mode, and a data enable signal DTEN representative of an effective pixel section of the reading width. The mode signals MD0 and MD1 are routed to the color compounding and erasing circuts 64 while the data enable signal DTEN is fed to the trimming circuits 67 and 68 and the SP converters 69 and 70. A pulse generator 82 functions to generate a clock signal CLK2 and a clock signal 2ELCK produced by dividing the frequency of the clock signal CLK2 at positive-going edges of the latter. The clock signals CLK2 and 2ELCK are applied to a parallel-to-serial (PS) converting and memory accessing section 83, which will be described.

An input/output circuit 84 is adapted to input a control signal from the CPU 66 to the pulse generator 82, and to generate control signals outputted by the CPU 66 and DMA controller 71, i.e., a print enable signal EP representative of an effective period of image recording, a reset signal REST1 for initializing the system, a load signal LD representative of the end of transfer of the first one line of data, a mode signal MODE1 representative of a color mode, and a signal THWR indicating that one byte of data are completed. The print enable signal EP is applied to the simultaneous reading and thermal head I/F section 80, the PS converting and memory accessing section 83, and a thermal head print controller 85 which will be described. The reset signal RST1 is fed to the PS converting and memory accessing section 83 and the thermal head print controller 85. The load signal LD and mode signal MODE1 are fed to the thermal head print controller 85. Further, the signal THWR is fed to the PS convering and memory accessing section 83.

The simultaneous reading and thermal head I/F section 80 is adapted to implement a direct record mode for directly recording an image read by means of the printer 14. In this mode, only black and white image fragments are recorded due to the particular processing rate. Hence, the black record data BVc outputted by the trimming circuit 67 is fed to the thermal head 21 as the record data DT1, and a shift clock SFTCK generated inside of the SP converter 69 is fed to the same as the clock signal CK1. Upon completion of the transfer of one line of black record data BVc, a latch signal LT1 is produced. Since the thermal head 21 is driven on a two-division basis, strobe signals STB1 (1) to STB4 (1) for turning ON the former four blocks of the thermal head 21 and strobe signals STB5 (1) to STB8 (1) for turning ON the latter four blocks of the same are provided. Processing of one line is executed in synchronism with the line synchronizing signal LNSYN. Further, the CPU 66 delivers to the simultaneous reading and thermal head I/F section 80 pulse width data DP1 for setting up pulse widths of the strobe signals STB1 (1) to STB4 (1) and STB5 to STB8 (1). The latch signal LD1, record data DT1 and clock signals STB1 to STB4 (1) and STB5 to STB8 (1) are fed to one input side A of a selector 86.

The PS converting and memory accessing section 83 reads black record data BVc and red record data RVc alternately out of the data memory 65 on a line basis, converts them into serial data, and delivers the serial data as record data DT2 which are to be transferred to the thermal head 21. At the same time, the section 83 outputs a clock signal CK2 for inputting the record data DT2 to the thermal head 21. The operation for one line begins in synchronism with a one-line end-of-load signal LDG which is outputted by the thermal head print controller 85. While reading data out of the data memory 65, the PS converting and memory accessing section 83 is caused by the DMA controller 71 to transfer data at a high speed.

The thermal head print controller 85 produces a latch signal LT2 to be fed to the thermal head 21, and strobe signals STB1 (2) to STB4 (2) and STB5 (2) to STB8 (2). Upon completion of processing of one line, the controller 85 generates the one-line end-of-lodge signal LDG and applies it to the PS converting and memory accessing section 83. The CPU 66 delivers to the controller 85 pulse width data DP2 for setting up pulse widths of the strobe signals STB1 (2) to STB4 (2) and STB5 (2) to STB8 (2). It is to be noted that the end-of-lodge signal LDG is used within the controller 85 also. The latch signal LT2, record data DT2, clock signal CK2, and strobe signals STB1 (2), to STB4 (2) and STB5 (2) to STB8 (2) are applied to the other input side B of the selector 86. Because the PS converting and memory accessing section 83 and the thermal head print controller 85 are timed to each other by the end-of-lodge signal LDG, each of the latch signal LT2, record data DT2, clock signal CK2, and the strobe signals STB1 (2) to STB4 (2) an STB5 (2) to STB8 (2) is fed to the thermal head 21 at a predetermined timing.

The selector 86 selects its input terminals A and B when a select signal SL applied thereto from the CPU 66 via the input/output circuit 84 is ONE and ZERO, respectively, signals appearing on the selected input terminal A or B being delivered to the thermal head 21. Specifically, when the input terminal A is selected, the latch signal LT1, record data DT1, clock signal CK1, and strobe signals STB1 (1), to STB4 (1) and STB5 (1) to STB8 (1) are delivered to the thermal head 21 as the latch signal LT, record data DT, clock signal CK, and strobe signals STB1 to STB4 and STB5 to STB8, respectively. Likewise, when the input terminal B is selected, the latch signal LT2, record data DT2, clock signal CK2, and strobe signals STB1 (2) to STB4 (2) and STB5 (2) to STB8 (2) are delivered to the thermal head 21.

A heat accumulation data reading section 87 calculates, based on the record data DT fed to the thermal head 21, the number of heating elements to be driven for each predetermined number of blocks. Every time this section 87 completes the calculation, it applies an interrupt signal INT to the CPU 66 to apply the result to the latter. This allow the CPU 66 to identify the state of heating, or that of heat accumulation, of the thermal head 21 and, then, determine the pulse widths of strobe signals to be fed next. It is to be noted that a reset signal RST1 which is produced within the thermal head print controller 85 by inversion is applied to the heat accumulation data reading section 87. A thermistor, not shown, is built in the thermal head 21. The output of the thermistor is converted by an analog-to-digital (AD) converter 88 into a digital signal and read by the CPU 66 at any desired timing, whereby head temperature information is directly fed to the CPU 66 and referenced during the processing for determining the pulse widths of the strobe signals.

In operation, as the operator selects the black/red mode, sets "1" as the number of copy, and depresses the start key 54, the CPU 66 drives the sheet motor 76 to feed the sheet 1 in the forward direction and at the same time, enables the line image sensor 9 and 10 to read an image which is written on the sheet 1. Because the black/red mode is selected, the CPU 66 sets a black/red mode in the color compounding and erasing circuit 64 and, in this condition, causes the SP converters 69 and 70 to convert, respectively, black record data BVc and red record data RVc into parallel signals. These record data BVc and RVc are individually written into predetermined areas of the data memory 65 by the DMA controller 71. When one screen of image has been fully read and stored in the data memory 65, the CPU 66 drives the printer 14 to record the stored image. Specifically, the CPU 66 first causes the selector 86 to select the input terminal B and, after setting up the black/red mode by means of the mode data MODE1, activates the PS converting and memory accessing section 83 and thermal head print controller 85. Simultaneously, the CPU 66 rotates the motor 27 of the printer 17 in the counterclockwise direction A.

Consequently, the black record data BVc and the red record data RVc stored in the data memory 65 are read out alternately by the PS converting and memory accessing section 83 on a line basis, whereby record data DT2 and clock signal CK2 are produced and fed to the thermal head 21 via the selector 86 as the data DT and the clock signal CK, respectively. As a result, the record data DT are stored in the shift register SRG (see FIG. 2) of the thermal head 21. Immediately after one line of data have been delivered as stated above, the thermal head print controller 85 produces a latch signal LT2 which is fed to the thermal head 21 via the selector 86 as the latch signal LT, so that the data in the shift register SRG of the thermal head 21 become stored in the latch circuit LCT (see FIG. 2).

Strobe signals STB1 (2) to STB4 (2) and STB5 (2) to STB8 (2) each having a pulse width which corresponds to pulse width data DP2 as produced by the CPU 66 are delivered sequentially. These strobe signals STB1 (2) to STB4 (2) and STB5 (2) to STB8 (2) are fed as the strobe signals STB1 to STB4 and STB5 to STB8 to the thermal head 21 via the selector 86, whereby the thermal head 21 is operated to record one line of image. Simultaneously, the recording paper 20 is fed by the motor 27 at a predetermined rate to record the image read in black, white and red.

In response to an interrupt signal INT from the heat accumulation data reading section 87, the CPU 66 receives output data of the section 87 and, based on those data and temperature information outputted by the AD converter 88, produces pulse width data DP2. Specifically, the CPU 66 determines if data to be recorded then is black record data BVc or red record data RVc and, if it is black data BVc, sets up a pulse width whose center is the pulse width b previously mentioned and, if it is red data RVc, sets up a pulse width whose center is the pulse width (c−b), each based on the data. Further, the pulse width data DP2 is changed over immediately before the strobe signals STB1 to STB4 or STB5 to STB8 are delivered, and is fed to the thermal head print controller 85.

As the processing described so far is executed until one page of image fragments have been recorded, the CPU 66 drives the motor 27 in the counterclockwise direction B to cause the cutter 23 to cut the recording paper 20. Consequently, a copy of the information which is written in one screen is produced. In case that the number of copies set by the operator is two or more, the above processing will be repeated by the number of times corresponding to the number of copies.

Assume that the operator has selected the elongate mode. Then, when the start key 54 is depressed, the CPU 66 causes an image to be read by the prevously stated manner while causing the selector 86 to select the input terminal A. Simultaneously with the start of image reading, the CPU 66 drives the motor 27 in the counterclockwise direction A so as to activate the printer 14. In this case, therefore, record data DT1 and clock signal CK1 from the simultaneous reading and thermal head I/F section 80 are applied as, respectively, the record data DT and the clock signal CK to the thermal head 21 via the selector 86. As one line of record data DT are entered into the shift register SRG of the thermal head 21, a latch signal LT1 is fed as the latch signal LT from the simultaneous reading and thermal head I/F section 80 to the thermal head 21 via the selector 86, whereby the one line of record data DT in the shift register SRG are transferred to the latch circuit LCT.

Subsequently, strobe signals STB1 (1) to STB4 (1) and STB5 (1) to STB8 (1) are sequentially delivered as the strobe signals STB1 to STB4 and STB5 to STB8 from the simultaneous reading and thermal head I/F section 80 to the thermal head 21 via the selector 86. This drives the thermal head 21 to record one line of black-white image fragments in the recording paper 20. In this case, the CPU 66 selects as the pulse width data DP1 only the pulse width for recording black record data BVc, in the previously stated manner. In the elongate mode selected, the processing described above is executed until four pages or screens of images have been fully read and recorded or until the clear/stop key 53 has been depressed.

Upon completion of image recording, the recording paper 20 is cut as in the previously described mode. It will thus be understood that, in accordance with this particular embodiment, the elongate mode causes images to be recorded in black and white only and, therefore, the "all-black" and the "red erase" color mode can be set up. Further, in the elongate mode operation, the number of copies produced is necessarily "1" because the images read are not stored in the data memory 65. It is to be noted that the CPU 66 sets up a pulse width for each of the strobe signals STB1 to STB8 and, therefore, the duration of drive of each block of the thermal head 21 is controlled on the basis of the content of the immediately preceding record data. By the above procedure, a desired number of copies are produced in a desired mode.

When the date copy mode is selected, the CPU 66 transfers date display data stored beforehand in a predetermined area of the data memory 65 to a writing system, at the instant when one page of image recording is completed. This allows a date to be recorded at the end of a recorded image.

Further, when the "all-black" or the "red erase" color mode is selected to record an image as a black-white image, the CPU 66 while reading an image activates the simultaneous reading and thermal head I/F section 80 and, at the same time, causes the SP converters 69 and 70 and DMA controller 71 to store the image read in the data memory 65. Upon completion of the image reading, the CPU 66 operates the PS converting and memory accessing section 83 and thermal head print controller 85 by the number of times corresponding to the remaining number of copies to be produced, whereby the image data are read out of the data memory 65 to be printed. In this manner, when a black-white image is to be recorded, the first copy begins to be produced immediately after the depression of the start key 54, i.e., the waiting time before the production of the first copy is shortened.

Figure 11:
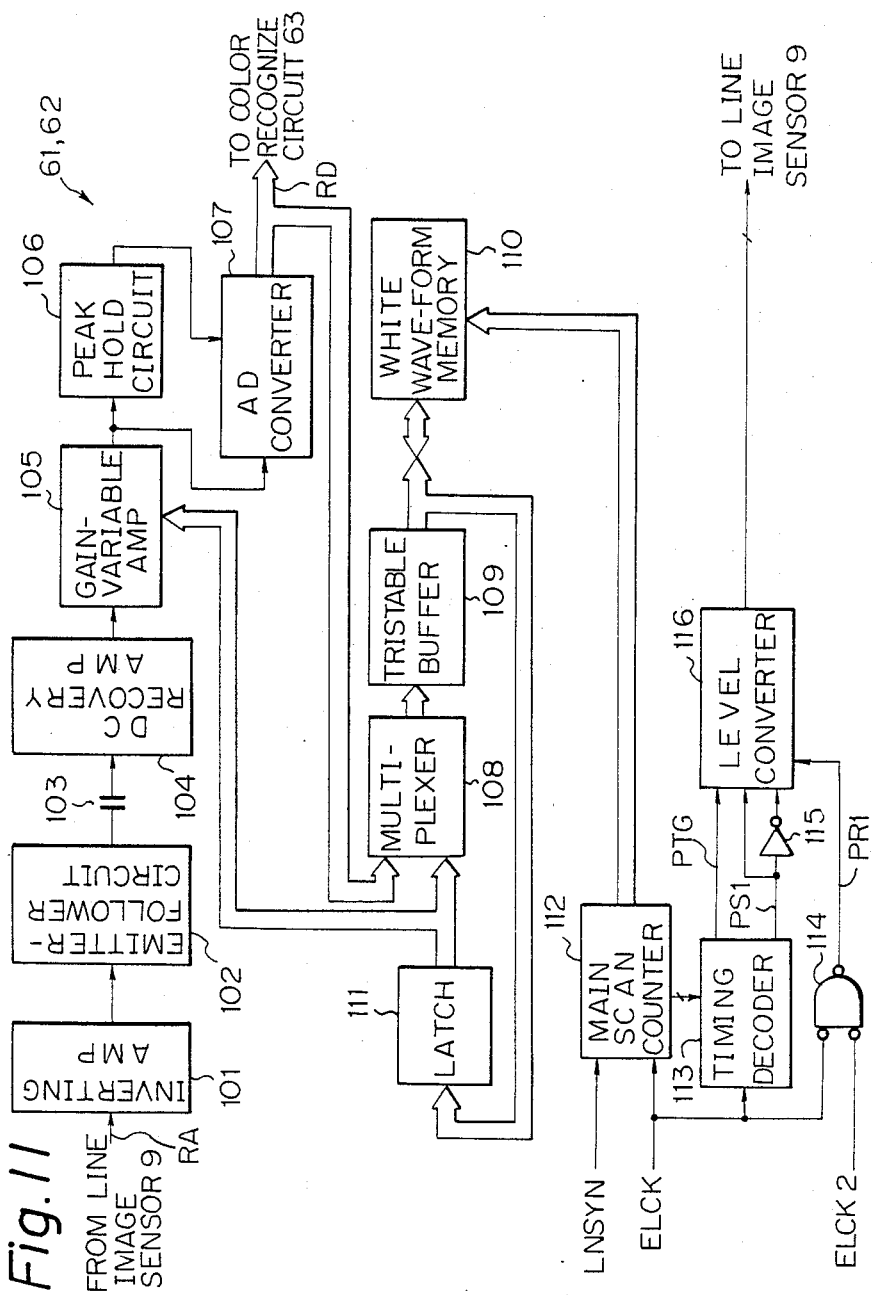
FIG. 11 is a block diagram showing a specific construction of a sensor driving and image signal processing section.

Referring to FIG. 11, a specific construction of the sensor driving and image signal processing section 61 is shown. It is to be noted that the arrangement of FIG. 11 applies to the other sensor driving and image signal processing section 61 also. As shown, an analog image signal RA from the line image sensor 9 is inverted by an inverting amplifier 101, then subjected to impedance conversion by an emitter-follower circuit 102, then applied to a capacitor 103 to remove its DC component, then fed to a DC recovery amplifier 104 to set up a reference level, and then routed to a peak hold circuit 106 and an AD converter 107 via a gain-variable amplifier 105. The peak hold circuit 106 detects a peak value of each line and applies the detected peak to a reference level input terminal of the AD converter 107, so that the analog image signal RA is converted into a digital image signal RD having a predetermined number of bits and free from background level.

The output of the AD converter 107 is fed to the color recognizing circuit 63 and, at the same time, to a white wave-form memory 110 via a multiplexer 108 and a tristate buffer circuit 109. By the circuitry shown and described, a digital image signal RD representative of a white or reference image which was read at the beginning of image reading is stored in the white wave-form memory 110 to serve as reference white wave-form data. While an image on the sheet 1 is actually read, the data stored in the memory 110 is latched in the latch circuit 111 and applied as gain data to the variable-gain amplifier 105, whereby shading of an image read is corrected.

The line synchronizing signal LNSYN from the pulse generator 79 is applied to a main scan counter 112. The clock signal ELCK is applied to the main scan counter 112, a timing decoder 113, and a gate circuit 114. Further, the clock signal ELCK2 is applied to the gate circuit 114. The main scan counter 112 serves to generate address data for accessing the white wave-form memory 110 and to set up an operation timing of the timing decoder 113. In this construction, the reference white wave-form data from the memory 110 are read out bit by bit to subject an image read to bit-by-bit shading correction. The timing decoder 113 is adapted to generate a pulse signal PTG for setting up an image read start timing of the line image sensor 9, as well as a transfer clock signal PS1. THe pulse signal PTG, the transfer clock signal PS1, and a signal produced by inverting the transfer clock PS1 by an inverter 115 are fed to a level converter 116. A reset signal PR1 for resetting the output of the line image sensor 9 on a bit basis is fed from a gate 114 to the level converter 116. The level converter 116 functions to convert each signal inputted thereto to the input level of the line image sensor 9, and to feed it to the line image sensor 9 to thereby drive the latter.

Figure 12:
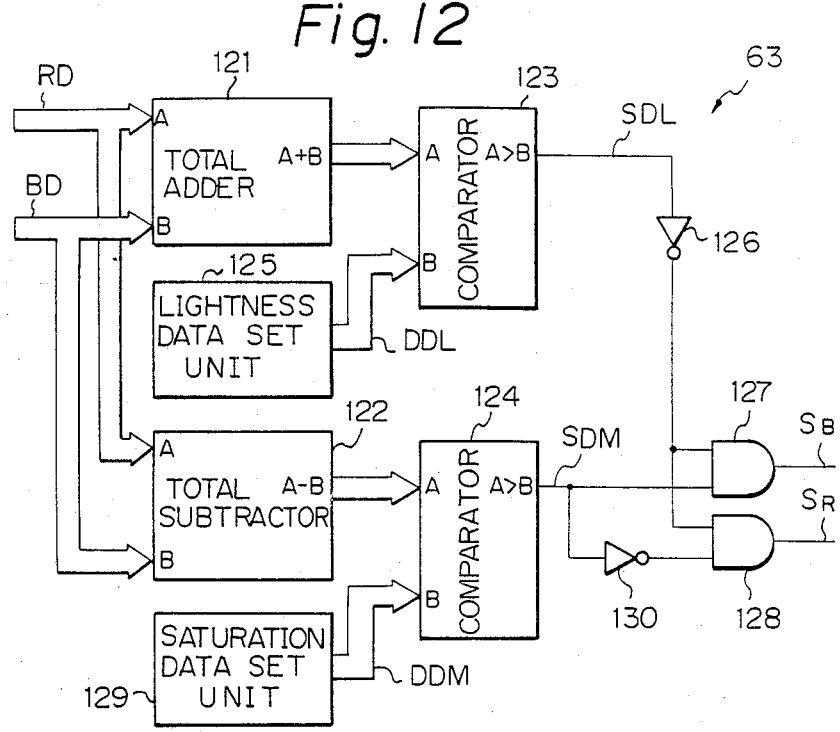
FIG. 12 is a block diagram showing a specific construction of a color recognizing circuit.

Referring to FIG. 12, a specific construction of the color recognizing circuit 63 is shown. As shown, a digital image signal RD is applied to an input terminal A of a total adder 121 and that of a total subtractor 122, while a digital image signal BD is applied to input terminals B of the total adder 121 and total subtractor 122. The total adder 121 is adapted to produce a total sum of the digital image signals RD and BD, output data of the adder 121 being fed to an input terminal A of a comparator 123. On the other hand, the total subtractor 122 totally subtracts the digital image signal BD from the digital image signal RD, output data of the subtractor 122 being fed to an input terminal of a comparator 124. Fed to a reference input terminal B of the comparator 123 is lightness data DDL which is outputted by a lightness data setting unit 125 for identifying black-white (lightness) of an image. When the data on the input terminal A is greater than the data on the input terminal B, the comparator 123 produces a ONE as its output signal SDL which is fed to one input terminal of AND gates 127 and 128 via an inverter 126.

Fed to a reference input terminal b of the comparator 124 is saturation data DDM which is outputted by a saturation data setting unit 129 for identifying saturation (red) of an image. When data on the input terminal A is greater than data on the input terminal B, the comparator 124 produces a ONE as its output signal SDM which is fed to the other input terminal of the AND gate 127 and, via an inverter 130, to the other input terminal of the AND gate 128. In this construction, a black signal SB is produced from the AND gate 127, and a red signal SR from the AND gate 128. The lightness data setting unit 125 may be implemented with a latch circuit or similar circuit whose set value can be changed by the CPU 66. Such allows the value of lightness data DDL to be increased when the mode for increasing the copy density is selected, thereby increasing the copy density. Further, the lightness data DDL and the saturation data DDM may alternatively be determined directly by the CPU 66.

Figure 13:
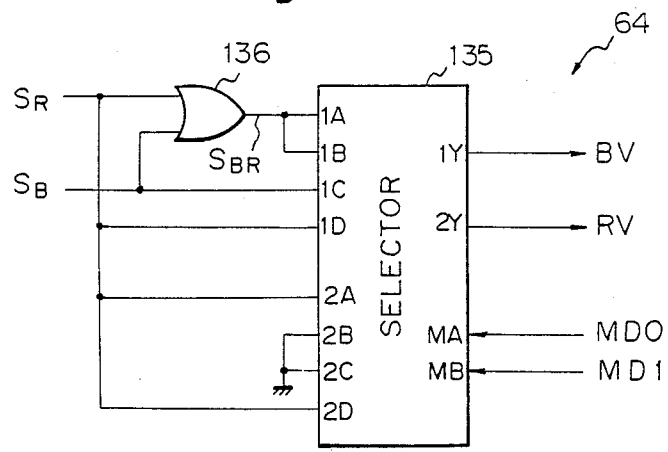
FIG. 13 is a block diagram showing a specific construction of a color compounding and erasing circuit.

Referring to FIG. 13, a specific construction of the color compounding and erasing circuit 64 is shown. A red signal SR is fed to input terminals 1D, 2A and 2D of a selector 135 as well as to one input terminal of an OR gate 136. A black signal SB is applied to an input terminal IC of the selector 135 and to the other input terminal of the OR gate 136. The output signal SBR of the OR gate 136 is routed to input terminals 1A and 1B of the selector 135. Input terminals 2B and 2C of the selector 135 are connected to ground and, therefore, applied with a ZERO. Depending upon the values of mode signals MD0 and MD1 which are applied to control input terminals MA and MB, the selector 135 selects any of the input terminals (1A, 2A), (1B, 2B), (1C, 2C), and (1D, 2D) so as to connect the input terminal 1A, 1B, 1C or 1D to an output terminal 1Y and the input terminal 2A, 2B, 2C or 2D to an output terminal 2Y.

By the construction described above, black record data BV and red record data RV are respectively produced from the output terminals 1Y and 2Y depending upon the logical values of mode signals MD0 and MD1, as tabulated below.

TABLE 1

| COLOR MODE | MA | MB | BV | RV |
| --- | --- | --- | --- | --- |
| BLACK/RED | ZERO | ZERO | SBR | SR |
| ALL BLACK | ONE | ZERO | SBR | ZERO |
| RED ERASE | ZERO | ONE | SB | ZERO |
| BLACK ERASE | ONE | ONE | SR | SR |

In the manner described, record data are formed in any of the black/red, all-black, red erase, and black erase color modes. Record data may be provided in any color mode other than those mentioned above, if desired.

Figure 14:
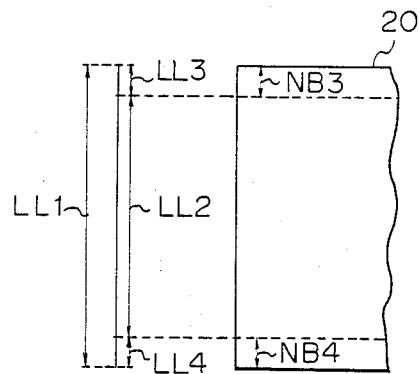
FIG. 14 is a schematic view useful for explaining the principle of an trimming circuit.

Hereinafter will be described the trimming circuits 67 and 68. As shown in FIG. 14, assume that the entire width of the sheet 1 is LL1. To record only that part of an image which is covered by the intermediate width LL2 of the sheet 1 while masking those parts which are covered by remaining end segments LL3 and LL4, what is required is converting, among recode data, the number of pixels NB4 which correspond to the first length LL3 and the number of pixels NB4 which correspond to the last length LL4, into white image fragments.

Figure 15:
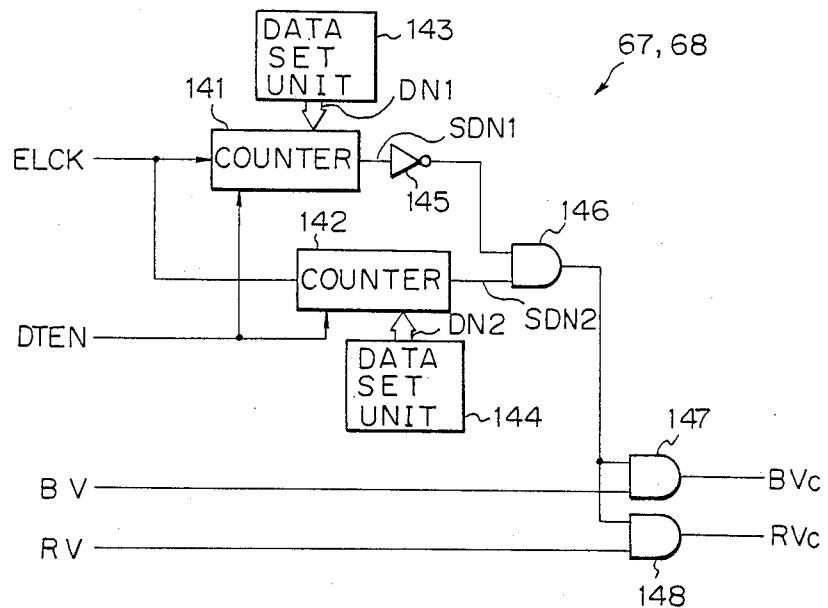
FIG. 15 is a block diagram showing a specific construction of the trimming circuit.
Figure 16:
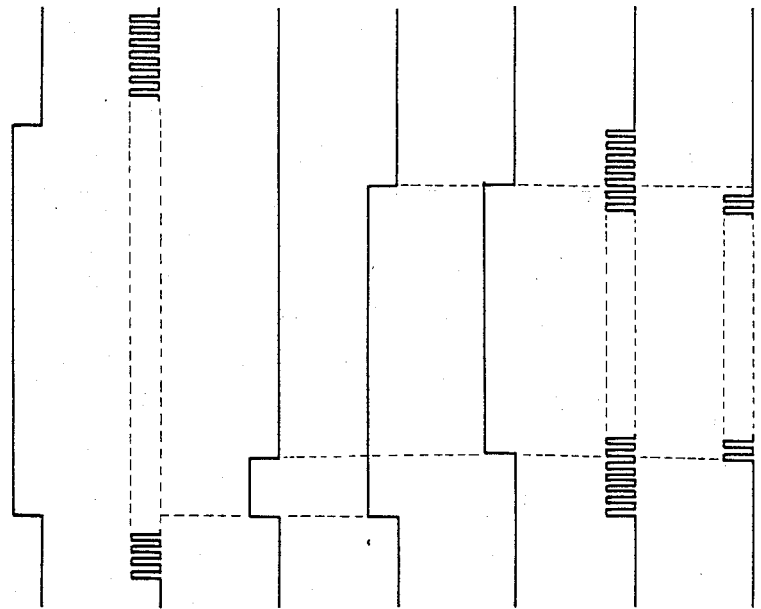
FIGS. 16A to 16G are wave-form diagrams demonstrating the operation of the trimming circuit.

FIG. 15 shows a specific construction of the trimming circuit 67. It is to be noted that the construction shown in FIG. 15 applies to the other trimming circuit 68 also. As shown, a clock signal ELCK (see FIG. 16B) is applied to clock input terminals of counters 141 and 142, and a data enable signal DTEN (see FIG. 16B) is applied to enable input terminals of the counters 141 and 142. This allows each of the counters 141 and 142 to start at the instant when the data enable signal DTEN is fed thereto. Data DN1 corresponding to the number of pixels NB3 is fed from a data setting unit 143 to the counter 141, and data DN2 corresponding to the number of pixels which is produced by subtracting the number of pixels BN4 from the number of one line of pixels is fed from a data setting unit 144 to the counter 142. Hence, the counter 141 raises its output signal SDN1 (see FIG. 16C) to (logical) high level immediately after it has started counting, and lowers it to low level when the count reaches a value corresponding to the data DN1. Likewise, the counter 142 makes its output signal SDN2 (see FIG. 16D) high level immediately after it has started counting, and lowers it to low level when the count reaches a value corresponding to the data DN2.

The signal SDN1 is fed to one input terminal of an AND gate 146 via an inverter 145, while the signal SDN2 is fed to the other input terminal of the AND gate 146. The output signal of the AND gate 146 (see FIG. 16E) is routed to one input terminal of AND gates 147 and 148 which are adapted to gate, respectively, black record data BV and red record data RV (see FIG. 16F). Consequently, black data BVc and red data RVc each lacking those data which are positioned at both end portions of one line are provided and applied, respectively, to the SP converter 69 and simultaneous reading and thermal head I/F section 80 and the SP converter 70.

Figure 17:
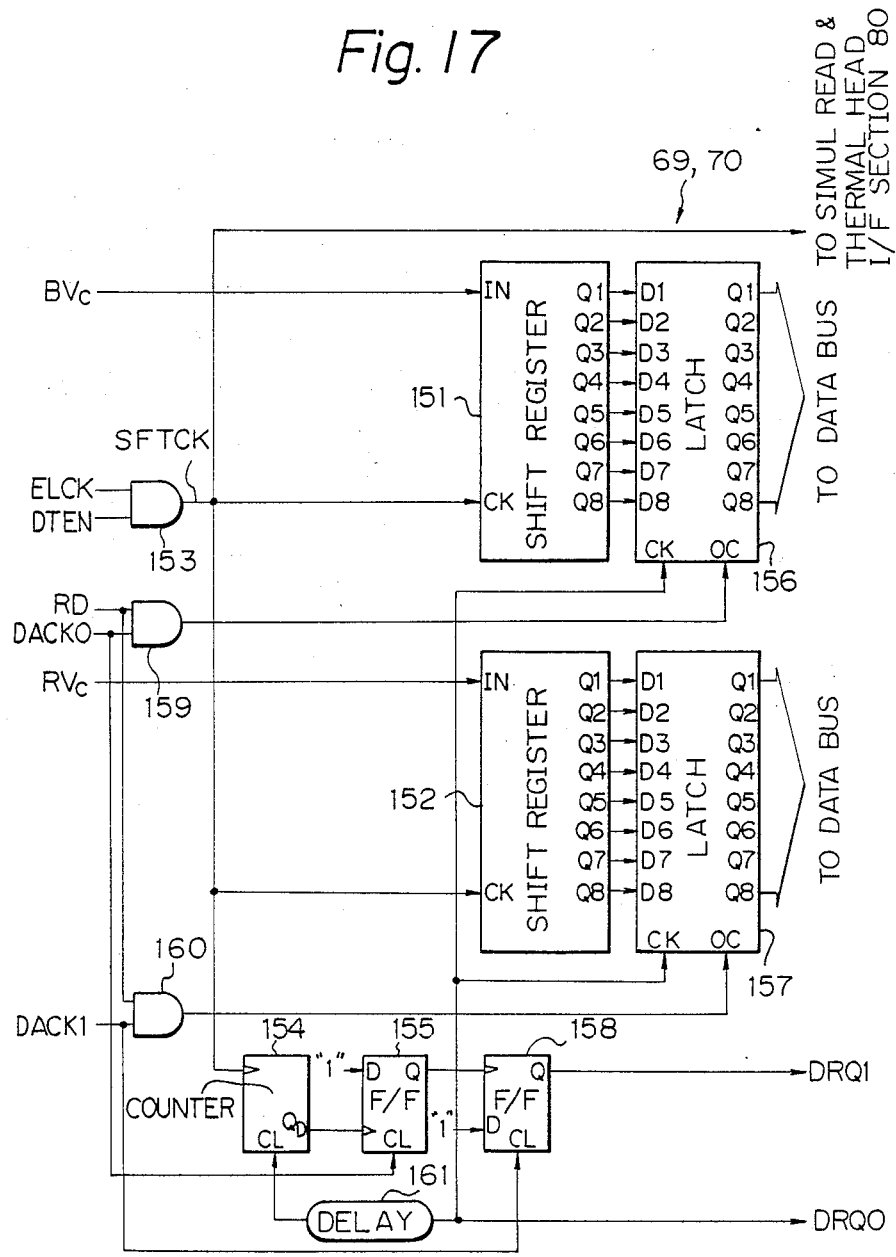
FIG. 17 is a block diagram showing a specific construction of a serial-to-parallel converting section.
Figure 18:
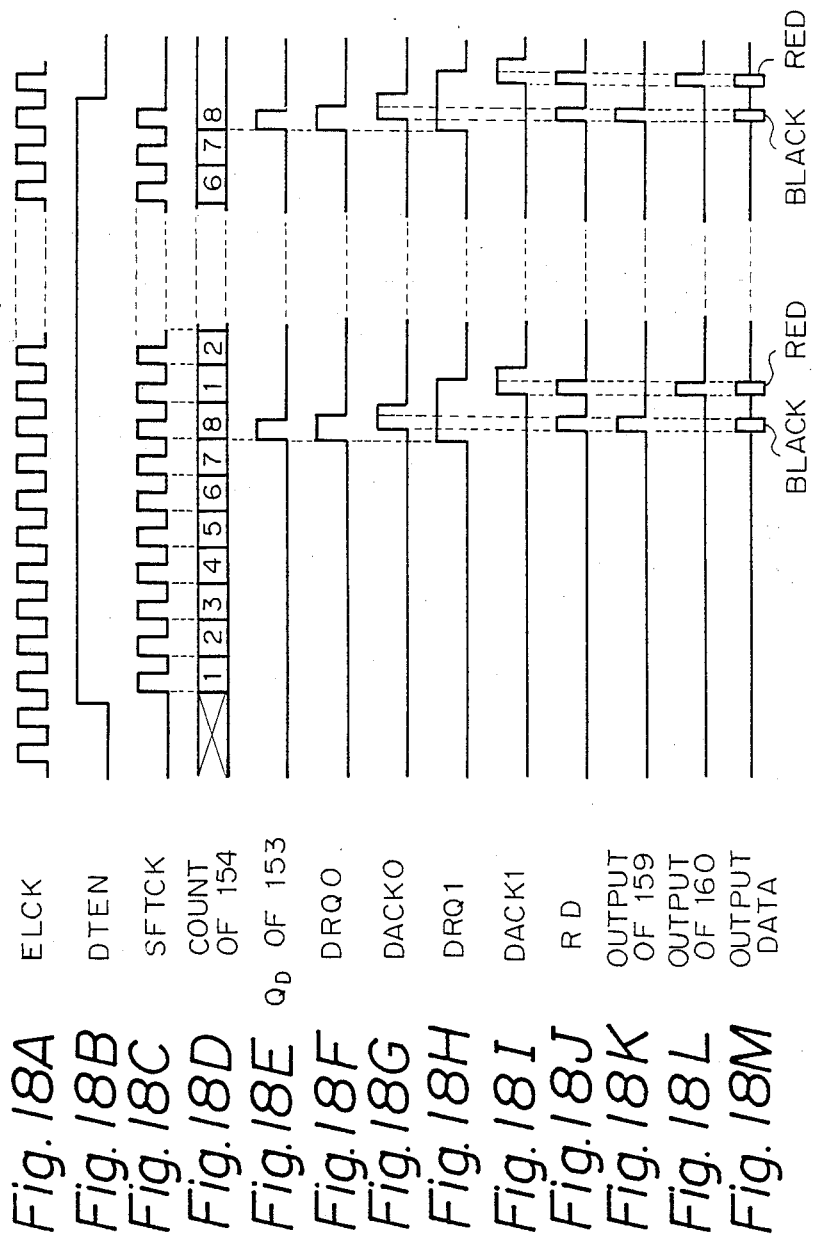
FIGS. 18A to 18M are wave-form diagrams representative of the operation of the SP converting section.

Referring to FIG. 17, a specific construction of the SP converters 69 and 70 is shown. In this particular example, the SP converters 69 and 70 are constructed integrally with each other, and the data bus of the system bus 74 is assumed to have a width of eight bits. As shown, black record data BVc and red record data RVc are fed to 8-bit shift registers 151 and 152, respectively. A clock signal ELCK (see FIG. 18B) and a data enable signal DTEN (see FIG. 18B) are applied one to a respective one of two input terminals of an AND gate 153. The output of the AND gate 153 is fed as a shift clock signal SFTCK (see FIG. 18C) to the shift registers 151 and 152 and a counter 154 as well as to the simultaneous reading and thermal head I/F section 80. When black and red record data BVc and RVc are transferred, respectively, to the shift register 151 and 152 by eight bits each, the output QD of the counter 154 becomes high level to set a flip-flop 155. The resultant output of the flip-flop 155 is applied as a data request signal DRQ0 (see FIG. 18F) to the DMA controller 71 while, at the same time, data stored in the shift registers 151 and 152 are latched, respectively, in the latch circuits 156 and 157 at the positive-going edge of the signal DRQ0. Further, a flip-flop 158 is set to feed its output to the DMA controller 71 as a data request signal DRQ1 (see FIG. 18H).

As stated above, after the data request signal DRQ0 has become high level, the data request signal DRQ1 becomes high level delayed by the operating time of the flip-flop 158. Hence, the DMA controller 71 first responds to the data request signal DRQ0 having priority by raising a data acknowledge signal DACK0 (see FIG. 18G), receiving from the CPU 66 an address of the data memory 65 to which the eight-bit black record data BVc of that instant is to be transferred, setting that address, and delivering a data read signal RD (see FIG. 18J) for a predetermined period of time. The data read signal RD is applied to an output control input terminal of the latch circuit 156 (see FIG. 18K) via an AND gate 159 which has been enabled by the data acknowledge signal DACK0, whereby the eight bits of black data BVc are stored in a predetermined area of the data memory (see FIG. 18M).

Subsequently, the DMA controller 71 responds to the data request signal DRQ1 by raising a data acknowledge signal DACKA1 (see FIG. 18I), receiving from the CPU 66 an address of the data memory 65 to which eight-bit red record data RVc of that instant should be transferred, setting that address, and delivering a data read signal RD for a predetermined period of time. This allows the data read signal RD to reach an output control input terminal of the latch circuit 157 (see FIG. 18L) via an AND gate 160 which has been enabled by the data acknowledge signal DACK1, whereby the eight bits of red record data RVc are stored in a predetermined area of the data memory 65. Further, the flip-flops 155 and 158 are respectively cleared by the data acknowledge signals DACK0 and DACK1, and the counter 154 is cleared by a delayed version of the output of the flip-flop 155 which is outputted by a delay circuit 161. This is followed by the next operation cycle.

Figure 19:
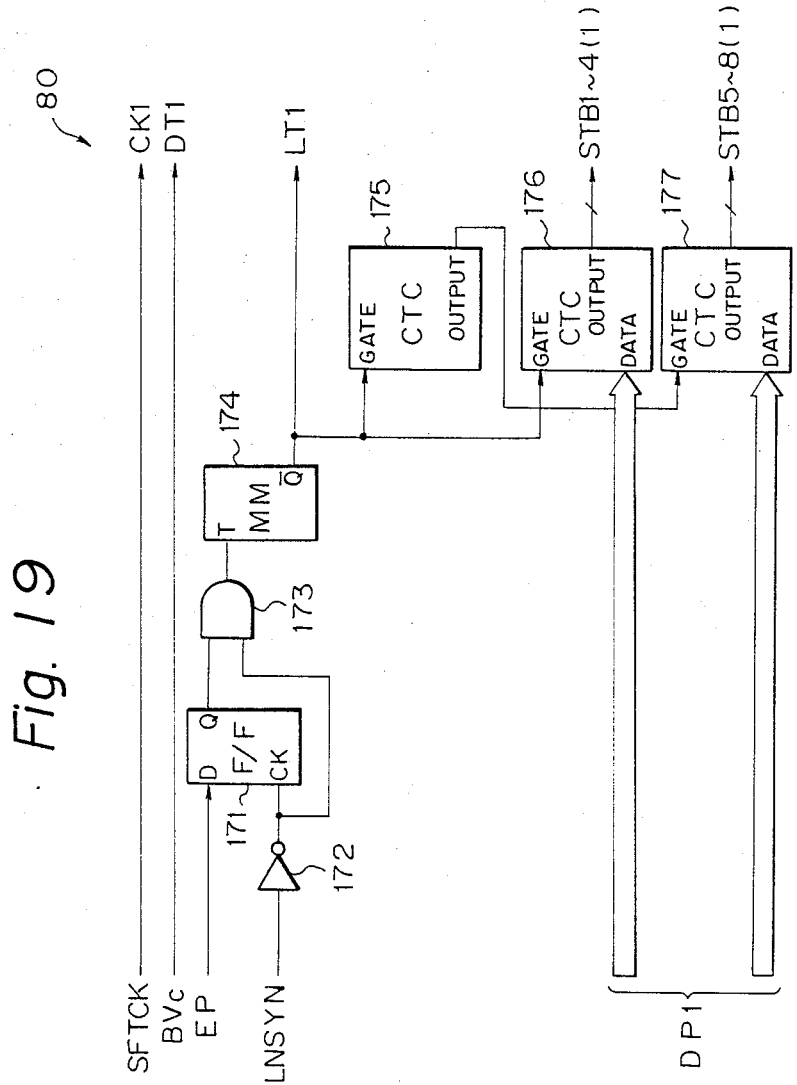
FIG. 19 is a block diagram showing an exemplary simultaneous reading and thermal head interface section.
Figure 20:
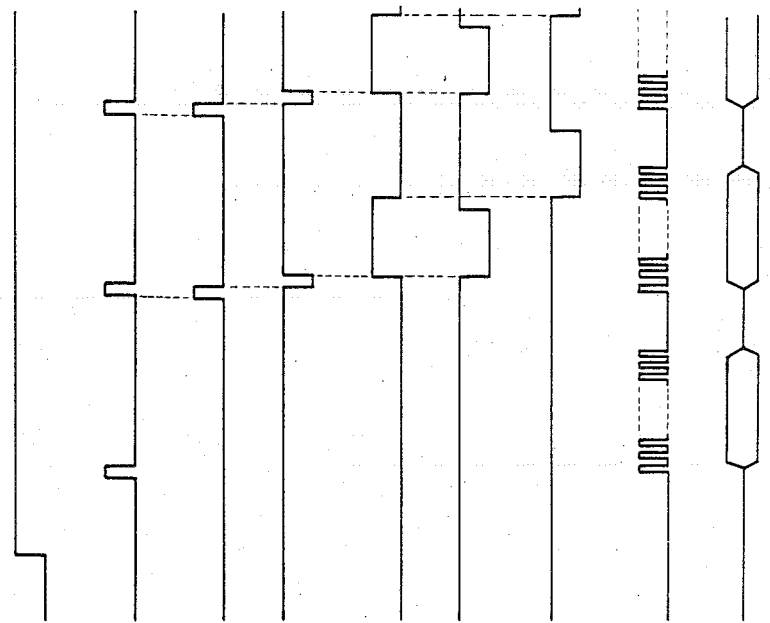
FIGS. 20A to 20I are wave-form diagrams demonstrating the operation of the simultaneous reading and thermal head interface section.

Referring to FIG. 19, a specific construction of the simultaneous reading and thermal head I/F section 80 is shown. A print enable signal EP (see FIG. 20A) which becomes high level at the start of recording is applied to a data input terminal of a flip-flop 171. A line synchronizing signal LNSYN (see FIG. 20B) which appears at the start of processing of one line is fed via an inverter 172 to a clock input terminal of the flip-flop 171. The output of the flip-flop 171 and that of the inverter 172 are individually applied to two input terminals of an AND gate 173. In this construction, the AND gate 173 produces the second line synchronizing signal LNSYN and onward which appear after the start of recording (see FIG. 20C). At the negative-going edge of the output of the AND gate 173, a monostable multivibrator 174 is enabled to deliver its output signal as a negative logic latch signal LT1 (see FIG. 20D). At the positive-going edge of the latch signal LT1, a counter/timer circuit 175 having a somewhat shorter period of time than one-half the frequency of the line synchronizing signal LNSYN and a counter/timer circuit 176 made up of four circuits, which individually have the pulse widths of the strobe signal STB1 (1) to STB4 (1) (see FIG. 20F), start to operate.

In the above construction, first, the counter/timer 176 produces the strobe signals STB1 (1) to STB4 (1). As the output of the counter/timer circuit 175 becomes low level (see FIG. 20E), a counter/timer circuit 177 made up of four circuits having the pulse widths of the strobe signals STB5 (1) to STB8 (1) (see FIG. 20G) is started. Hence, the strobe signals STB5 (1) to STB8 (1) are produced after the strobe signals STB1 (1) to STB4 (1). It is to be noted that the shift clock signal SFTCK and the black record data BVc are directly delivered as the clock signal K1 (see FIG. 20H) and the record data DT1 (see FIG. 20I), respectively. The pulse width data DP1 for setting up the pulse widths of the strobe signals STB1 (1) to STB4 (1) and STB5 (1) to STB8 (1) are loaded in, respectively, the counter/timer circuits 175 and 177 at adequate timings.

Figure 21:
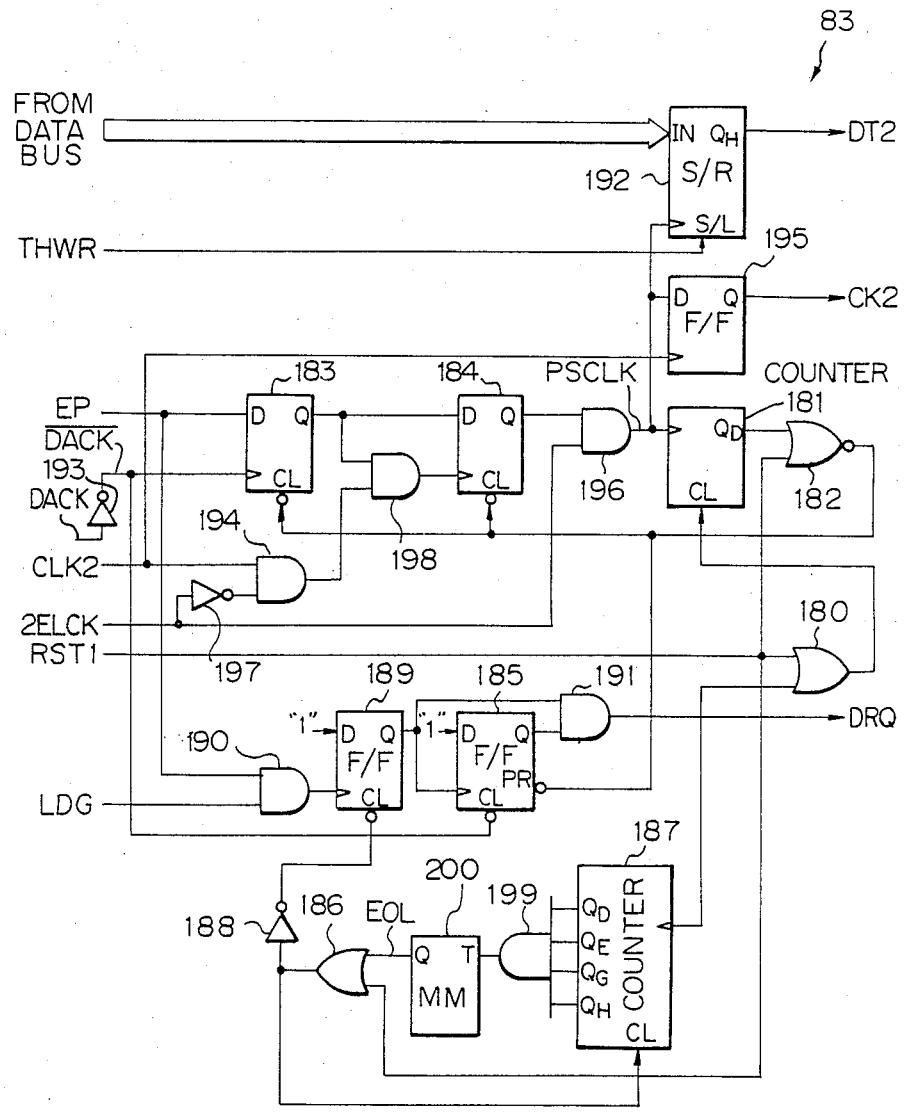
FIG. 21 is a block diagram showing a specific construction of a parallel-to-serial converting and memory accessing section.

Referring to FIG. 21, a specific construction of the PS converting and memory accessing section 83 is shown. First, when a reset signal RST1 (see FIG. 22C) for initializing the system is produced, a counter 181 is cleared by an output of the OR gate 180. Flip-flops 183 and 184 are cleared by an output of a NOR gate 182 (see FIGS. 22H and 22I) while, at the same time, a flip-flop 185 is preset to a set state (see FIG. 22G). Further, a counter 187 is cleared by an output of an OR gate 186 the output of which is fed to a flip-flop 189 via an inverter 188 to clear it (see FIG. 22F). Consequently, the PS converting and memory accessing section 83 is initialized. Next, as a print enable signal EP (see FIG. 22D) is produced, a data input terminal of the flip-flop 183 becomes high level and, because a negative logic end-of-lodge signal LDG (see FIG. 22E) is high level at that time, the output of an AND gate 190 becomes high level. This sets the flip-flop 189 the output of which is delivered as the data request signal DRQ to the DMA controller via an AND gate 191, which is connected to one input terminal of the flip-flop 185 (see FIG. 22J). The data request signal DRQ is counted by the counter 187.

Thereupon, the DMA controller 71 informs the CPU 66 of the occurrence of a data request so that the CPU 66 determines data to be outputted then and notifies the DMA controller 71 of its address. In response, the DMA controller 71 makes a data acknowledge signal DACK high level to read data out of that address of the data memory 65, while producing a signal THRW to latch that data in the shift register 192. The signal DACK is converted into a signal $\overline{\text{DACK}}$ (see FIG. 22K) which has been inverted by an inverter 193. At the negative-going edge of the signal $\overline{\text{DACK}}$, the flip-flop 185 is cleared to in turn make the data request signal DRQ low level. At the positive-going edge of the signal $\overline{\text{DACK}}$, the flip-flop 183 is set.

Meanwhile, a clock signal CLK2 (see FIG. 22A) is applied to one input terminal of an AND gate 194 as well as to a clock input terminal of a flip-flop 195. A clock signal 2ELCK (see FIG. 22B) is fed to one input terminal of an AND gate 196, which receives an output of the flip-flop 184 at the other input terminal, and to the other input terminal of the AND gate 194 via an inverter 197. The output of the AND gate 194 is applied to one input terminal of an AND gate 198 which receives the output of the flip-flop 183 at the other input terminal. In this arrangement, after the flip-flop 183 has been set, the output of the AND gate 194 is fed to the clock input terminal of the AND gate 194 via the AND gate 198 (see FIG. 22L), whereby the flip-flop 184 is set. Then, the AND gate 196 is enabled to allow the clock signal 2ELCK to be applied as the shift clock signal (see FIG. 22M) to the clock input terminals of the counter 181, flip-flop 195, and shift register 192.

Figure 22:
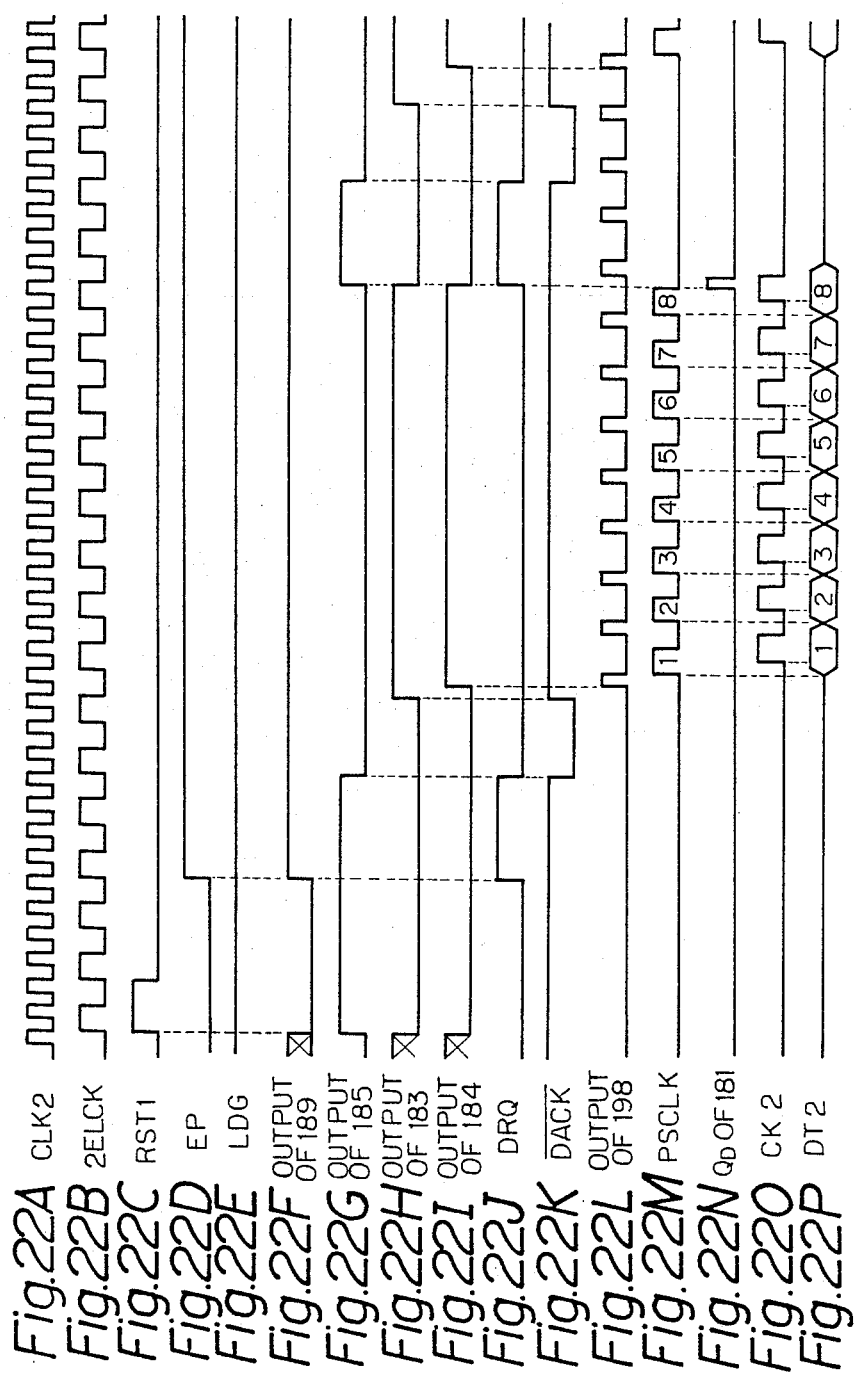
FIGS. 22A to 22P And 23A to 23I are wave-form diagrams representative of the operation of the PS converting and memory accessing section.
Figure 23:
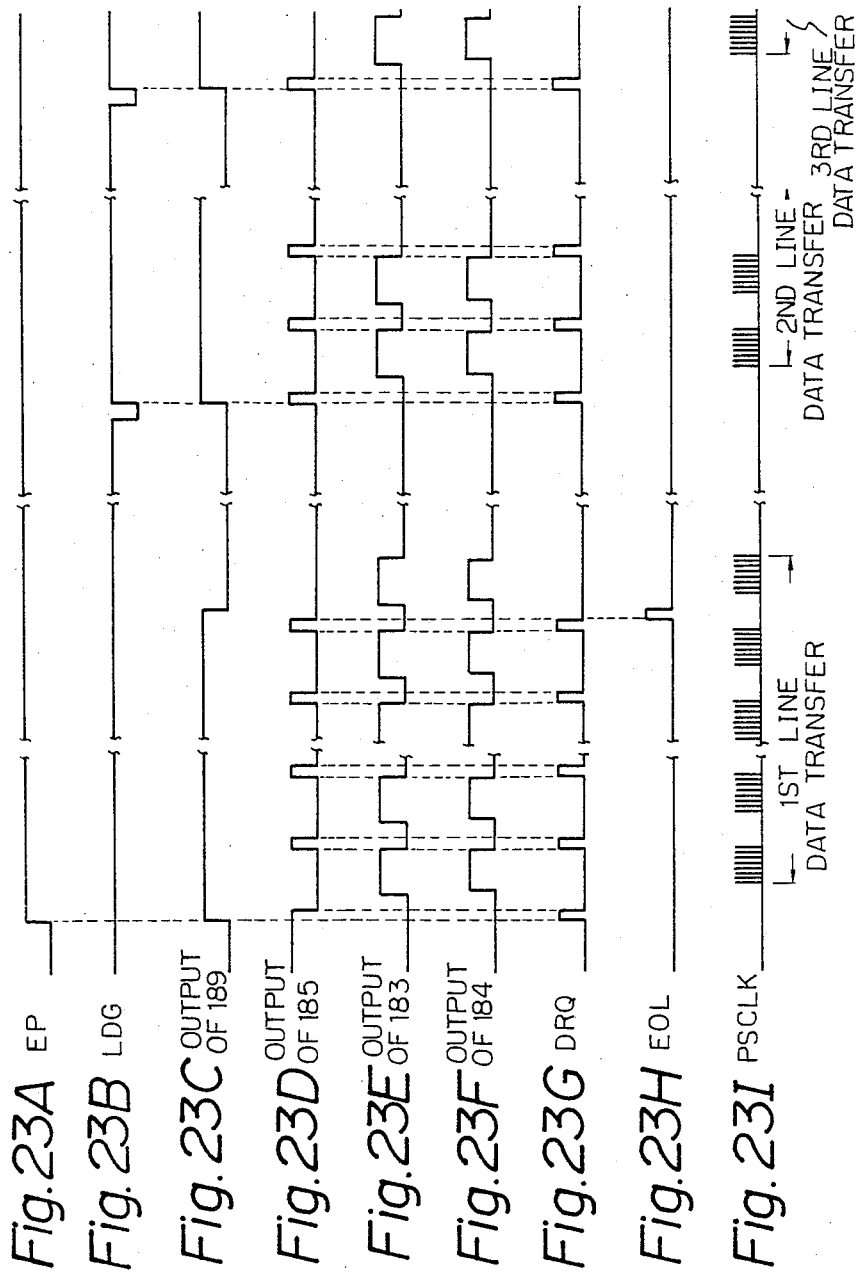

In the above condition, the flip-flop 195 produces a clock signal CLK2 as shown in FIG. 22O, and the shift register 192 produces record data DT2 as shown in FIG. 22P. As soon as the output terminal QD of the counter 181 becomes high level upon the delivery of collective eight bits of data from the shift register 192 (see FIG. 22N), the output of the counter 181 clears the flip-flops 183 and 184 via the NOR gate 182 and presets the flip-flop 185. Consequently, the PS converting and memory accessing section 83 is restored to the condition of the instant when the print enable signal EP appeared after the reset signal RST1.

The above procedure is repeated so that each eight bits of data are sequentially delivered as the serial record data DT2 while, at the same time, the counter is incremented (see FIGS. 23A to 23I). Upon completion of processing of one complete line, the counter 187 reaches a predetermined value, which in this particular embodiment is "216" because one line of data are assumed to comprise 1728 bits. Then, the output of a gate of the counter 187 becomes high level to trigger a one-shot circuit 200 which then produces an end-of-line signal EOL. This signal EOL clears the flip-flop 189 to stop the generation of the data request signal DRQ. Also, because the flip-flops 183 and 184 are maintained in their cleared condition at the instant when eight bits data of that time are fully outputted, the shift clock signal PSCLK disappears. Thereafter, as the end-of-lodge signal LDG is outputted, the flip-flop 189 is set causing the PS converting and data accessing section 83 to repetitively executes the one-line processing as described above, until the print enable signal EP becomes low level.

Figure 24:
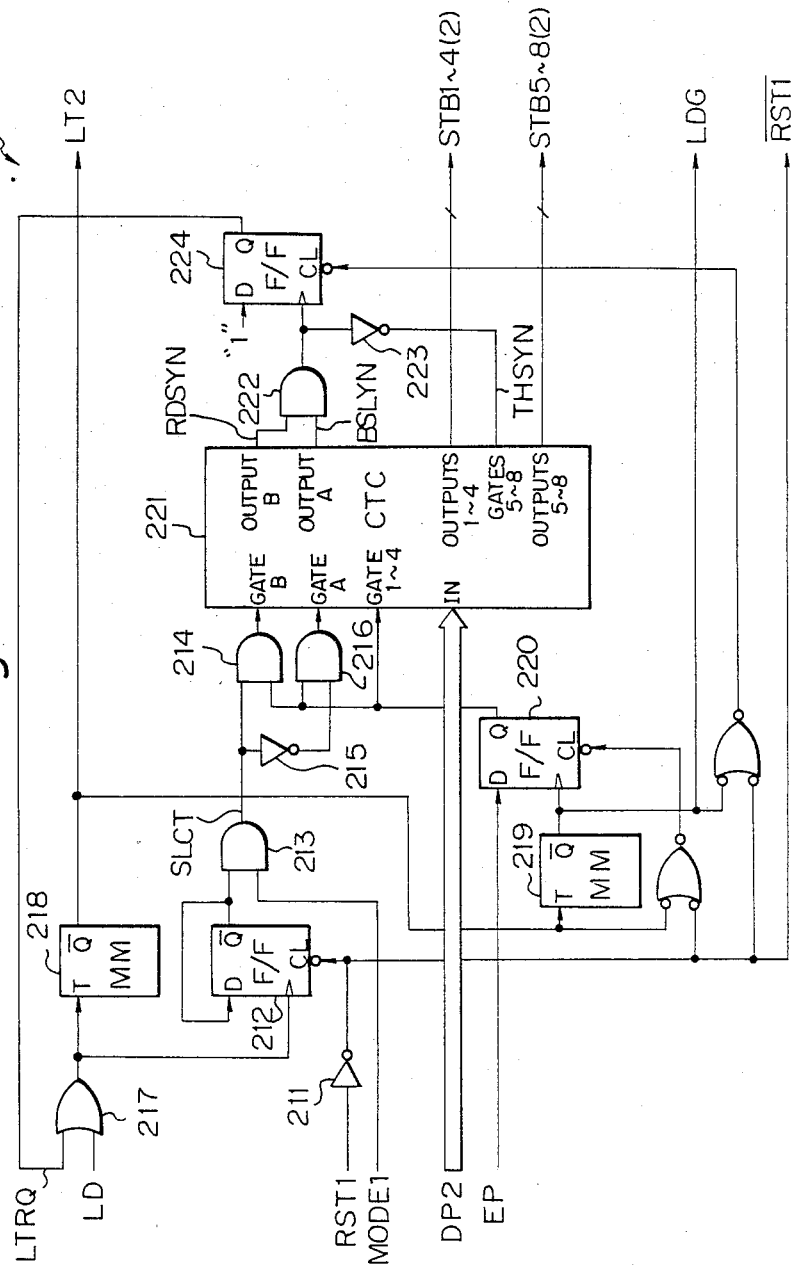
FIG. 24 is a block diagram showing a specific construction of a thermal head print controller.
Figure 25:
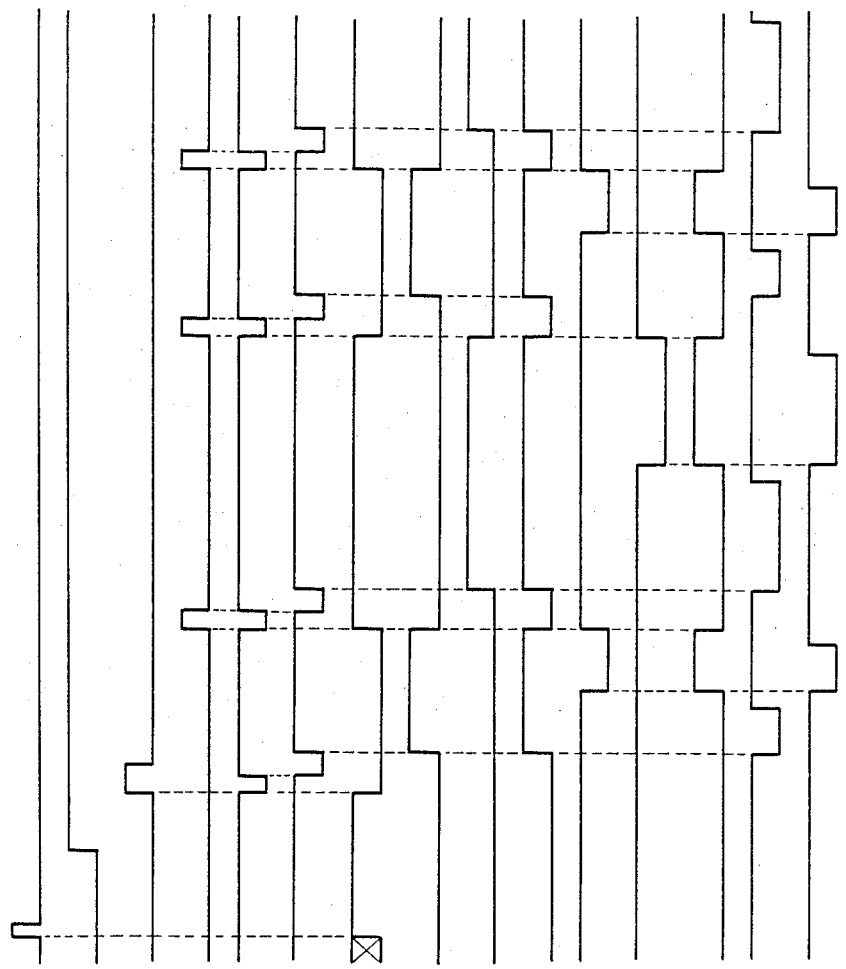
FIGS. 25A to 25O, 26A to 26H, and 27A–27H are wave-form diagrams showing the operation of the thermal head print controller.
Figure 26:
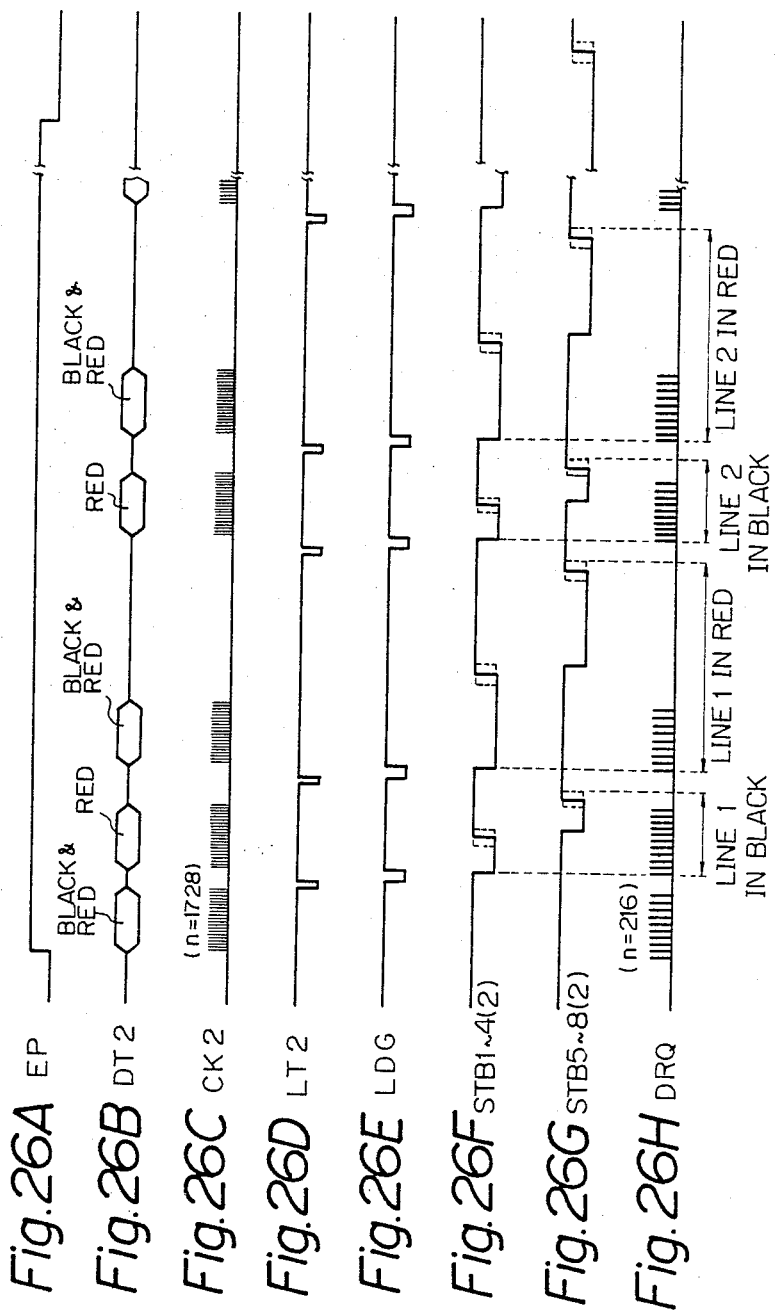
Figure 27:
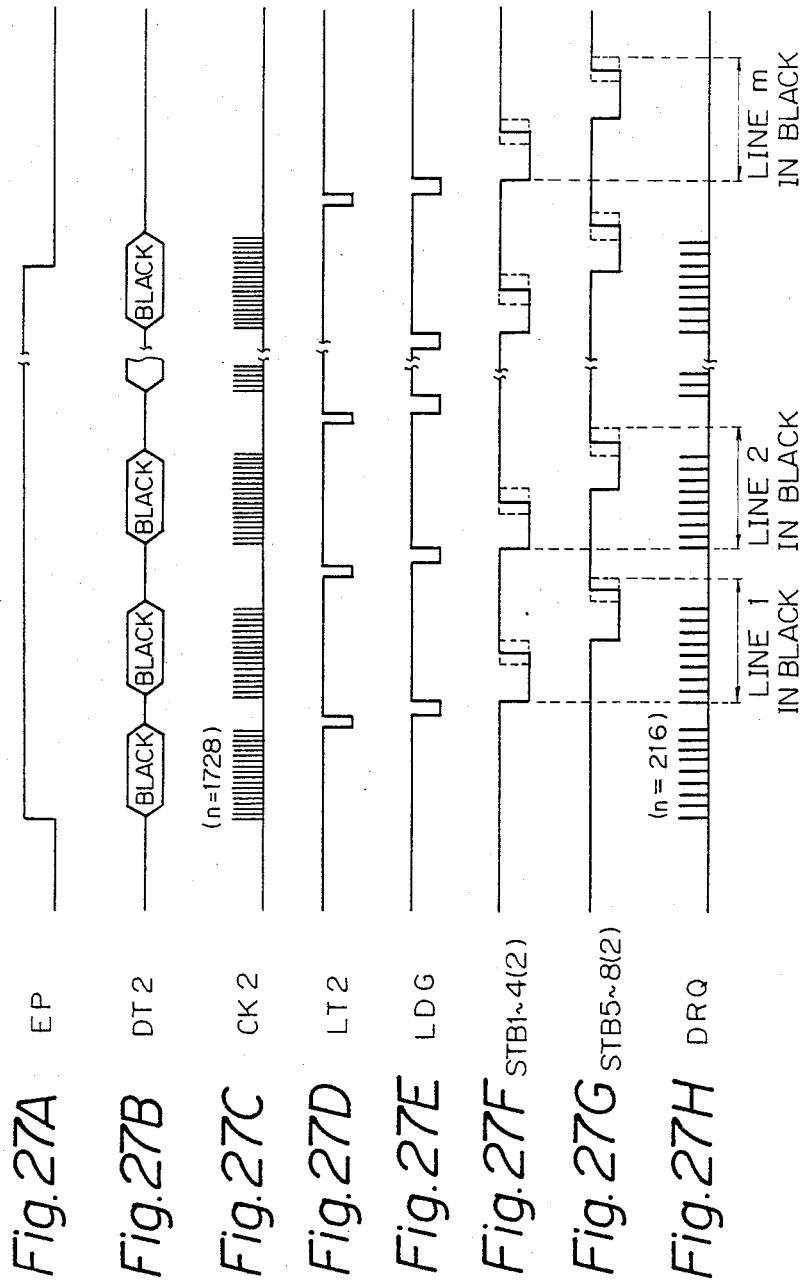

Referring to FIG. 24, a specific construction of the thermal head print controller 85 is shown. As shown, a reset signal RST1 (see FIG. 25A) adapted to initialize the system clears a flip-flop 212 after being inverted by an inverter 211, while being fed to the heat accumulation data reading section 87 as the reset signal $\overline{RST1}$. Assuming that the "black/red" or the "black erase" color mode has been selected, then the mode signal MODE1 is high level so that the output of an AND gate 213, which receives an inverted output of the flip-flop 212 at one input terminal and the mode signal MODE1 at the other input terminal, i.e., the select signal SLCT (see FIG. 25G) becomes high level. This signal SLCT is fed to one input terminal of an AND gate 214 and, via an inverter 215, to one input terminal of an AND gate 216.

After a print enable signal EP (see FIG. 25D) has been produced, the CPU 66 delivers a load signal LD (see FIG. 25C) when the transfer of one line of data from the PS converting and memory accessing section 83 is completed. The load signal LD triggers a one-shot circuit 218 via an OR gate 217 resulting that the circuit 218 produces a negative logic latch signal LT2 (see FIG. 25E). This causes the record data transferred to the shift register SRG of the thermal head 21 to be lodged in the latch circuit LCT. The flip-flop 212 is triggered by the output of the OR gate 217 to invert its output, whereby the select signal SLCT is turned into low level. At the positive-going edge of the latch signal LT2, a one-shot circuit 219 is triggered to produce a negative logic end-of-lodge signal LDG (see FIG. 25F). At the positive-going edge of the end-of-lodge signal LDG, a flip-flop 220 is set to enable the AND gates 214 and 216.

In the above condition, because the output of the AND gate 216 becomes high level, a gate A and gates 1 to 4 of a counter/timer circuit 221 are selected. The counter/timer circuit 221, therefore, produces a negative logic synchronizing signal BLSYN (see FIG. 25K) which remains low level for a period of time equal to one-half the maximum period of time which is necessary for one line of black recording, and negative logic strobe signals STB1 (2) to STB4 (2) (see FIG. 25N). As the synchronizing signal BLSYN rises, the output of an AND gate 222 falls resulting that the output of the AND gate 222 is inverted by an inverter 223. In response, a synchronizing signal THSYN (see FIG. 25M) applied to gates 5 to 8 of the counter/timer circuit 221 rises to cause the circuit 221 to produce negative logic strobe signals STB5 (2) to STB8 (2) (see FIG. 25O). Upon the rise of the synchronizing signal BLSYN, a flip-flop 224 is set to make a signal LTRQ (see FIG. 25D) high level. This signal LTRQ which is applied to the other input terminal of the OR gate 217 causes the latch signal LT2 and end-of-lodge signal LDG to be produced, as in the case wherein the load signal LD has been applied. In response to the end-of-lodge signal LDG, the flip-flop 224 is cleared to make the signal LTRQ low level.

When the signal LTRQ has appeared for the first time, the flip-flop 212 is triggered and inverted to change over the logical state of the select signal SLCT and, thereby, selects a gate B of the counter/timer circuit 211. As a result, the synchronizing signal BLSYN is replaced with a negative logic synchronizing signal RDSYN (see FIG. 25L) which remains low level for a period of time equal to one-half the maximum period of time which is necessary for one line of red recording. Thereafter, the above operation is repeated every time the signal LTRQ appears, until the print enable signal EP becomes low level. Such allows the operation for black recording and the operation for red recording to be executed alternately. It is to be noted that the pulse width data DP2 for setting the pulse widths of the strobe signals STB1 (2) to STB4 (2) and STB5 (2) to STB8 (2) is loaded in the counter/timer circuit 221 at a suitable timing. Further, while the "all black" or the "red erase" color mode is selected and the mode signal MODE1 is low level, the gate A of the counter/timer circuit 221 is selected constantly and, therefore, the operation for black recording only is repetitively executed. In the above-described manner, the latch signal LT2 and strobe signals STB1 (2) to STB4 (2) and STB5 (2) to STB8 (2) are generated, and the end-of-lodge signal LDG is outputted.

FIGS. 26A to 26H and 27A to 27H show the output conditions of various signals during data recording. Specifically, FIGS. 26A to 26H are representative of a case wherein the "black/red" color mode is selected. When the "black erase" color mode is selected, while the same timings as those of FIGS. 26A to 26H hold, the contents of all record data DT2 are "red". FIGS. 27A to 27H are representative of a case wherein the "red erase" color mode is selected. When the "all black" color mode is selected, while the same timings as those of FIGS. 27A to 27H hold, the contents of record data DT2 are "black and red".

Figure 28:
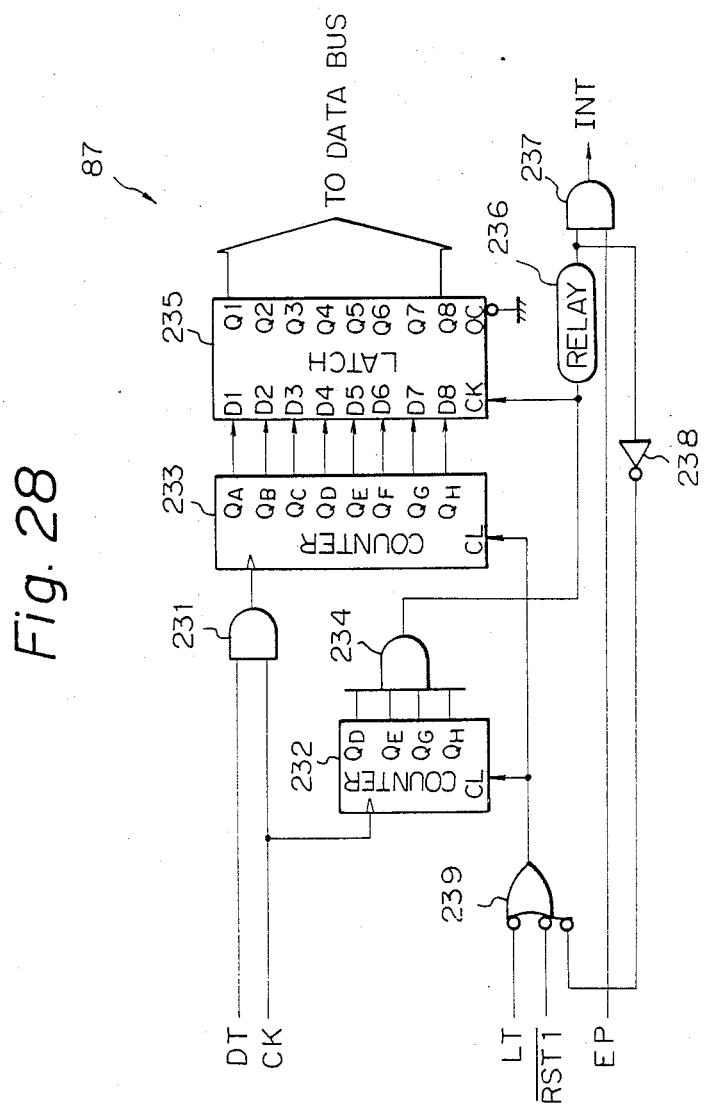
FIG. 28 is a block diagram showing a specific construction of a heat accumulation data reading section.

Referring to FIG. 28, a specific construction of the heat accumulation data reading section 87 is shown. As shown, the record data CK is applied to one input terminal of an AND gate 231 while the clock signal CK is applied to the other input terminal of the AND gate 231 and a clock input terminal of a counter 232. In this construction, the AND gate 231 produces the clock signal CK when the record data DT is ONE, the clock signal CK being counted by a counter 233. As the counter 232 reaches a predetermined value which, in this case, is equal to the number of heating elements included in each block of the thermal head, i.e., "216", the output of a gate 234 becomes high level so that the count of the counter 233 is stored in a latch circuit 235. The output of the gate 234 is fed to one input terminal of an AND gate 237 which receives the print enable signal EP at the other input terminal, via a delay circuit 236. The output of the AND gate 237 is applied to the CPU 66 as the interrupt signal INT, so that the CPU 66 reads the data stored in the latch 235. The latch signal LT, reset signal RST1, and an inverted version of the output of the delay circuit 236 which is outputted by an inverter 238 are applied to a NOR gate, the output of the NOR gate 239 resetting the counters 232 and 233.

As stated above, as soon as heat accumulation data associated with one block are counted, the interrupt signal INT is generated to lodge the data in the CPU 66.

While the embodiment of the present invention has been shown and described as recording AND data of black and red image fragments first and, then, red image fragment data, such a sequence of recording may be reversed. The color modes applicable to the present invention are not limited to those shown and described and may further include a color invert mode and others.

As to the composition of each layer of the recording paper 20, some different compositions are disclosed in Japanese patent laid-open publication (Kokai) Nos. 68991/1985 and 105586/1985 by way of example. In the first-mentioned publication, the red coloring layer contains leuco dyes and a phenolic compound, the black erase layer contains decolorizing agent as represented by a general formula (A), and the black coloring layer contains a thiourea derivative as represented by a general formula (B). As regards the general formulae (A) and (B), refer to the publication. On the other hand, in the second-mentioned publication, the red coloring layer contains leuco dyes and a phenolic compound, the black erase layer contains a morpholine compound and at least one decolorizing agent selected from aliphatic amines, the black coloring layer contains leuco dyes and a thiourea derivative as represented by a general formula (A), and a layer interposed between the black and black erase layers and whose major components are a thermofusible material and a water-soluble high molecule binder. Again, as to the general formulae (A) and (B), refer to the publication.

In summary, it will be seen that the present invention provides an image recording apparatus which is capable of recording within a short period of time an image which is made up of pixels having many different levels.

Various modifications will become possible for those skilled in the art after receiving the teachings of the present disclosure without departing from the scope thereof.

What is claimed is:

1. An apparatus for recording multi-colored composite images on an energy sensitive recording medium, wherein said image is defined by a pixel by pixel basis and wherein the multi-color image requires one energy level to produce one color and a higher energy level to produce a second color wherein said apparatus comprises:

a means for holding and advancing said recording medium;

record data combining means for combining a plurality of kinds of image data to produce an image which is a composite image, in which some image fragments are produced in which the amount of energy necessary to produce said image fragments is an amount of energy of the low level for recording one color and which is lower than said high level necessary for recording said second color;

a recording head for applying energy to said recording medium;

energy applying means for applying to the record head, when said image fragment is to be recorded at said lower energy level, an amount of energy corresponding to said lower level and for applying to the record head, when said image fragment is to be recorded at the higher level needed to record a second color the difference between said low level of energy necessary to record said first color and said higher level.

2. An apparatus as claimed in claim 1, wherein the level assigned to each of the record data comprises an upper limit of a predetermined range which corresponds to said record data.

3. An apparatus as claimed in claim 1, wherein the plurality of kinds of record data comprise black, white and red image data.

4. An apparatus as claimed in claim 3, wherein the recording medium comprises a multi-color heat-sensitive recording paper which comprises a paper base, a red coloring layer provided on said paper base, a black erasing layer provided on said red coloring layer, a black coloring layer provided on said black erasing layer, and a protective layer provided on said black coloring layer to face the record head.

* * * * *